United States Patent

[11] 3,597,963

| [72] | Inventors | Jaromir Smejkal<br>Plzen;<br>Miroslav Jindra, Malesice; Zdenek Brezina,<br>Stary Plzenec, all of, Czechoslovakia |
|---|---|---|
| [21] | Appl. No. | 844,900 |
| [22] | Filed | July 25, 1969 |
| [45] | Patented | Aug. 10, 1971 |
| [73] | Assignee | Skoda, oborovy podnik<br>Plzen, Czechoslovakia |

[54] APPRATUS FOR SWITCHING PULSES IN MEASURING THE VIBRATION OF ROTATING PARTS DURING OPERATION OF A MACHINE
8 Claims, 25 Drawing Figs.

| [52] | U.S. Cl. | 73/71.4 |
| [51] | Int. Cl. | G01h 11/00 |
| [50] | Field of Search | 73/71.4 |

[56] References Cited
UNITED STATES PATENTS
3,058,339  10/1962  Shapiro  73/71.4

*Primary Examiner*—James J. Gill
*Attorney*—Richard Low

ABSTRACT: A plurality of measuring pickups, reference pickups and auxiliary pickups are mounted on stationary parts of a machine. Parts to be measured are mounted on a rotating part of the machine. Reference elements and auxiliary elements are mounted on the rotating part. Each part to be measured induces a pulse in each measuring pickup as they pass each other. Each reference element induces a pulse in each reference pickup as they pass each other. Each auxiliary element induces a pulse in each auxiliary pickup as they pass each other. When an output pulse from a measuring pickup coincides with a pulse from a corresponding reference pickup an output pulse is produced which is supplied to a corresponding input of a switching circuit. The output pulse from each auxiliary pickup is supplied to a control circuit to control the switching circuit so that output pulses of a specific amplitude corresponding to one rotating part to be measured are supplied to one and the same output of the switching circuit.

Patented Aug. 10, 1971

INVENTORS
Jaromír Smejkal, Miroslav
Jindra, Zdeněk Březina
By Richard

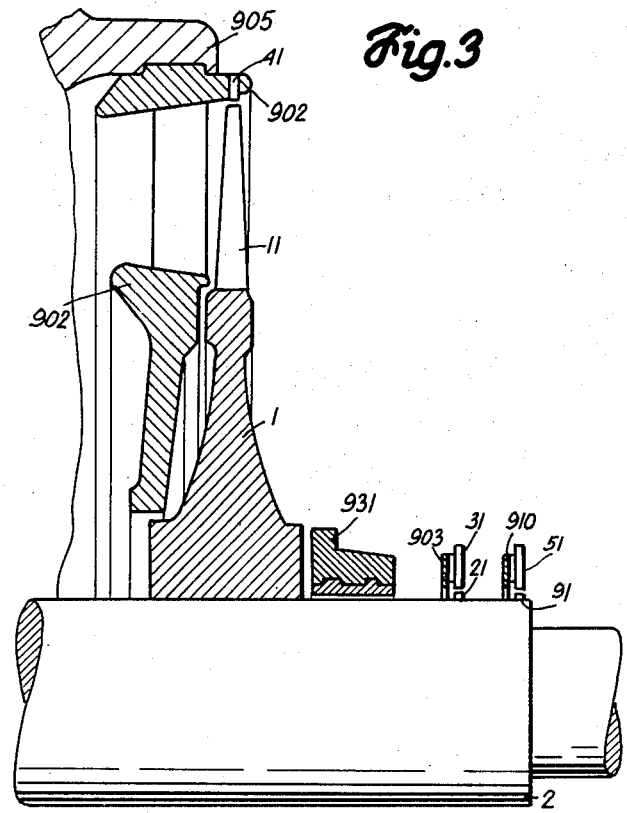
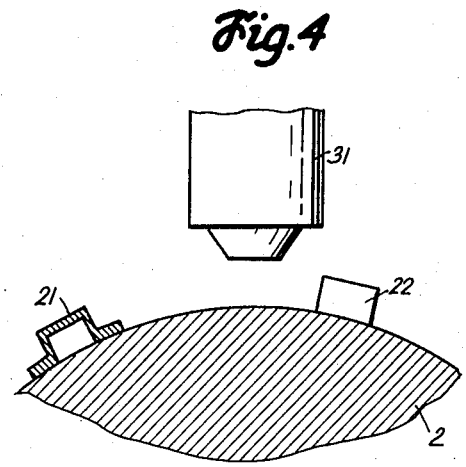
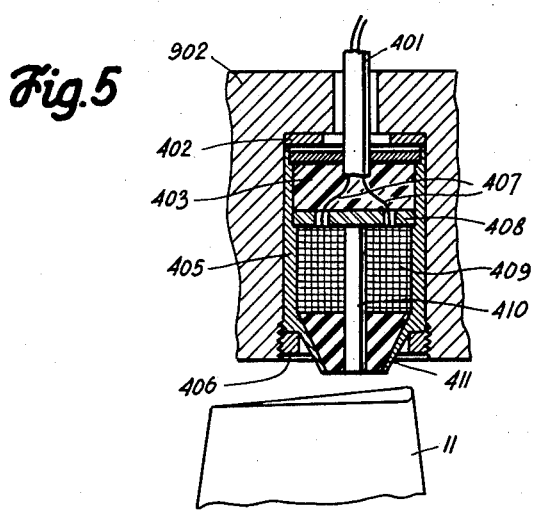
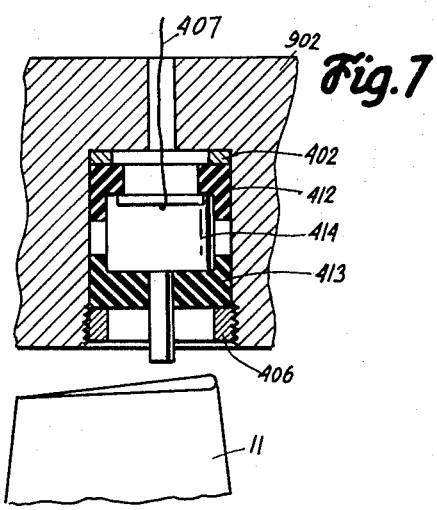
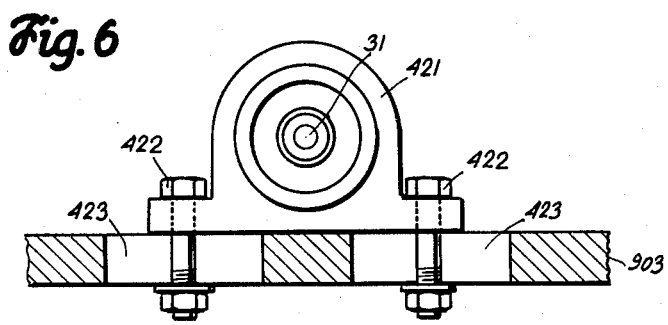

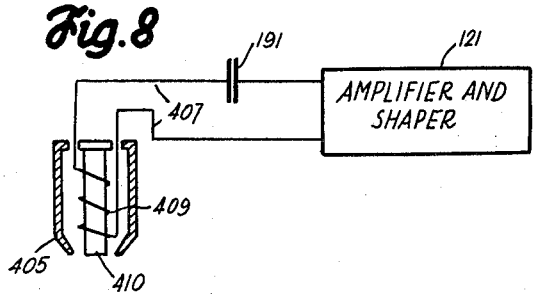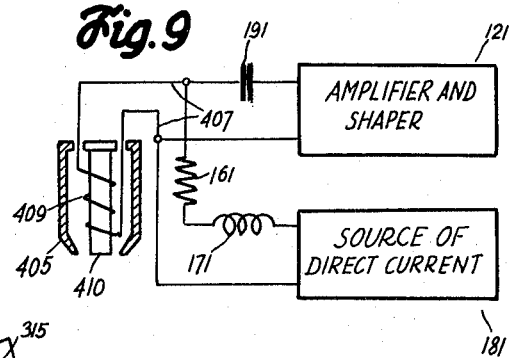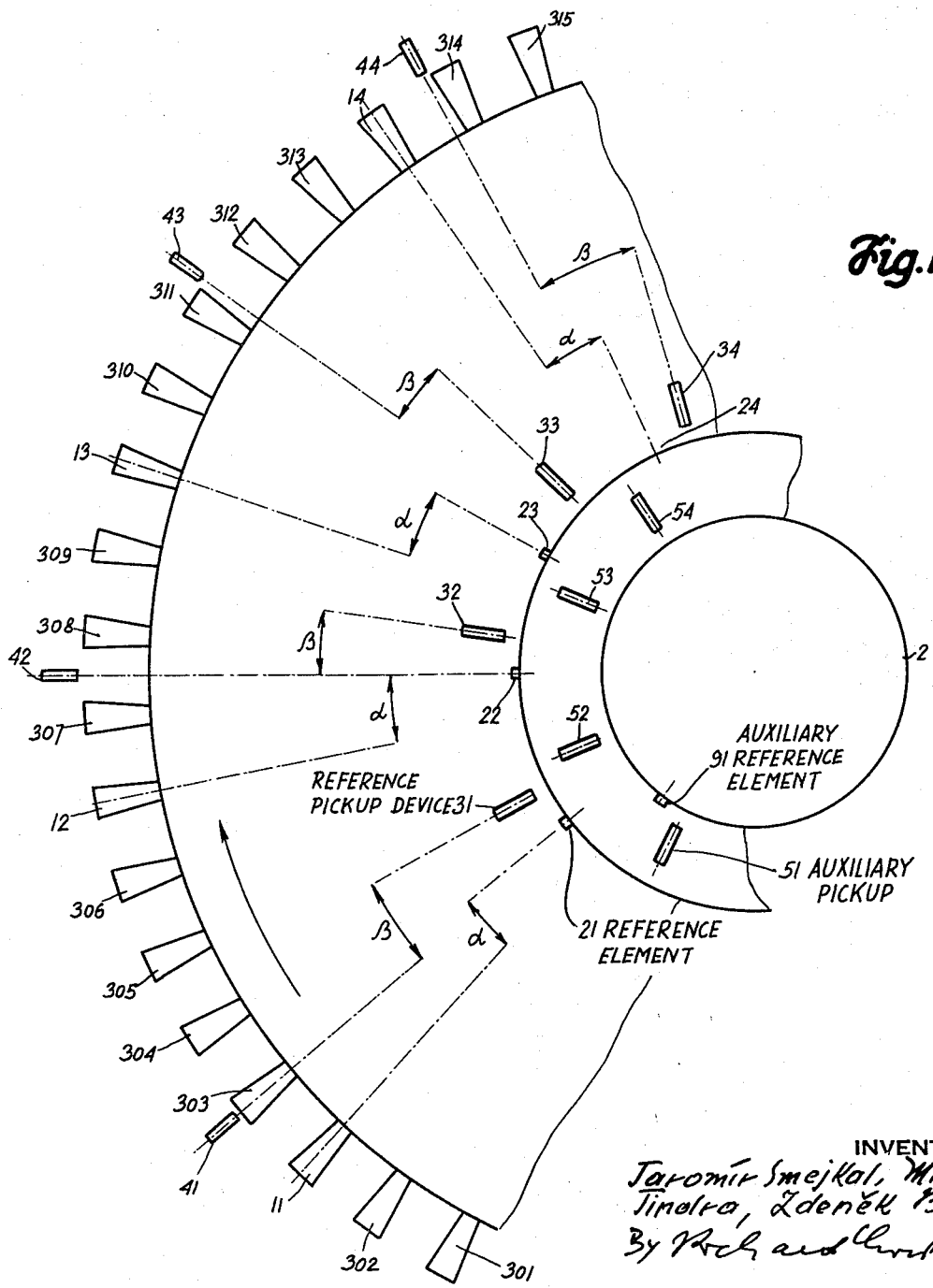

Patented Aug. 10, 1971

INVENTORS
Jaromír Smejkal, Miroslav
Jindra, Zdeněk Březina
By Richard Ord agt

Patented Aug. 10, 1971

INVENTORS
Jaromír Smejkal, Miroslav
Jindra, Zdeněk Březina

Patented Aug. 10, 1971

INVENTORS
Jaromír Smejkal, Miroslav Jindra, Zdeněk Březina
By Richard ...

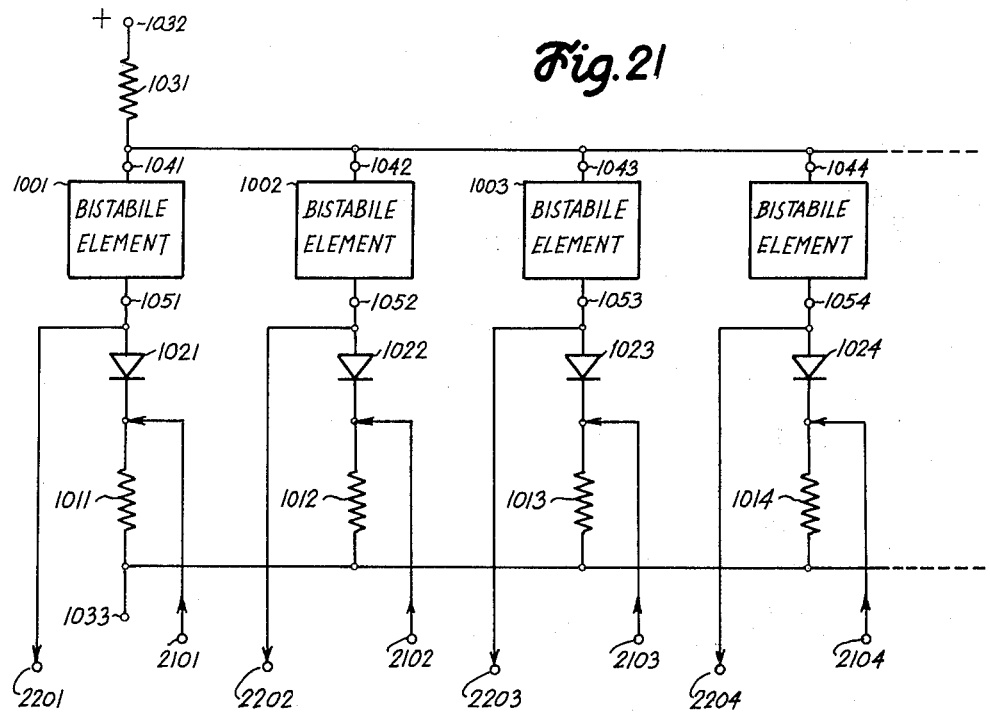
*Fig. 21*
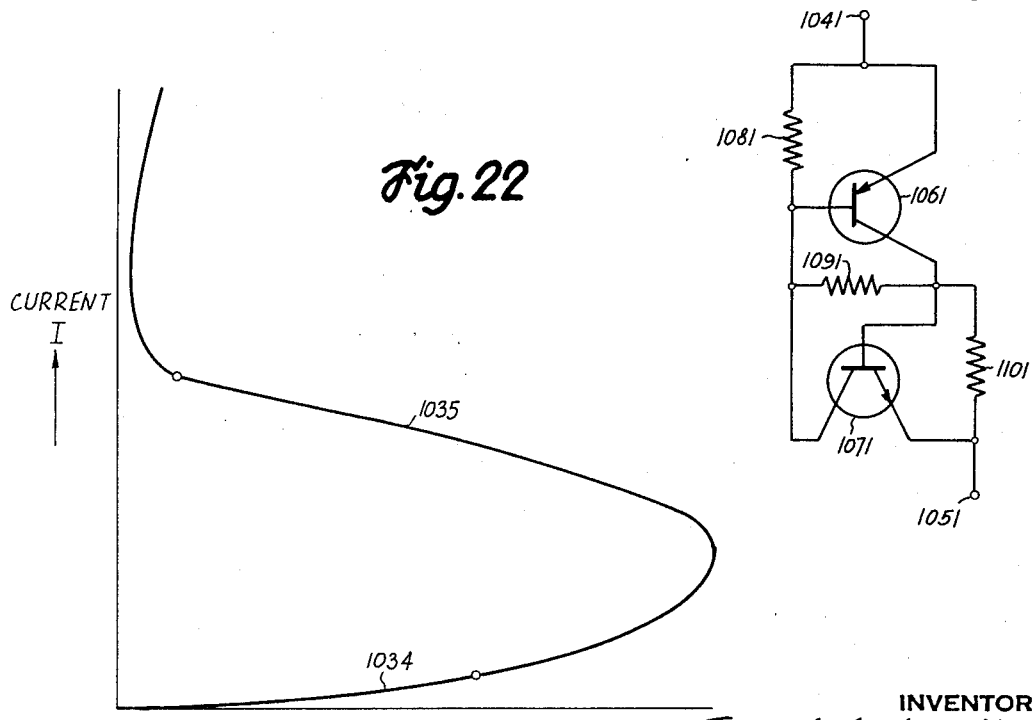
*Fig. 22*
*Fig. 23*
INVENTORS
Jaromír Smejkal, Miroslav
Jindra, Zdeněk Březina
By Richard Low Agt Patented Aug. 10, 1971

INVENTORS
Jaromír Smejkal, Miroslav
Jindra, Zdeněk Březina
By Richard Curl agt

APPRATUS FOR SWITCHING PULSES IN MEASURING THE VIBRATION OF ROTATING PARTS DURING OPERATION OF A MACHINE

DESCRIPTION OF THE INVENTION

The present invention relates to the measurement of the vibration of rotating parts during operation of a machine. More particularly, the invention relates to apparatus for switching pulses in measuring the vibration of rotating parts during operation of the machine. The parts whose vibration is measured are often turbine blades and the machine having such parts is a turbine, compressor or similar machine.

In order to make measurements of the type made by the apparatus of the present invention, it is presently necessary to position on the rotating blade whose vibration is to be measured, a pickup device which detects deflections, oscillations or vibrations. The pickup device produces an electrical output signal which is conducted by suitably insulated electrical conductors to collector rings on the shaft of the machine. The electrical signals are then conducted from the shaft of the machine to a rotary transformer or circuits which include capacitors. Other known methods of transmission utilize the output signal of the pickup device to modulate a high frequency transmitter mounted on the rotating part of the machine. Another known method for measuring oscillations, deflections or vibrations of the ends of rotating blades is based upon the magnetokinetic principle. In such a method of measurement, a permanent magnet is positioned in a hole formed in the rotating blade whose vibration is to be measured. In the course of rotation, the magnet induces an alternating electrical voltage in a meander-shaped winding positioned along the track of the permanent magnet on a fixed or stable part of the machine. It is possible to determine from the course of the induced voltage the amplitude and frequency of the deflections, vibrations or oscillations of the specimen rotating blade.

The known methods of measurement of deflection, oscillation or vibration and the transmission of the electrical signals produced thereby have a number of drawbacks which are due primarily to technological difficulties in designing electrical conductors on rotating parts, to the design of a rotating modulated transmitter at the supply sources, and to the mounting of the pickup devices, and the like. The manufacture of transmission elements such as, for example, rings and collector rings, rotating transformers and capacitor circuits, involves considerable difficulties, particularly when the centrifugal forces are great and the components operate in a medium of supersaturated or superheated steam, as in steam turbines.

A considerable drawback of the method utilizing the magnetokinetic principle, which avoids the use of electrical parts and conductors on the rotating part of the machine, is the considerable difficulty in preparing the meander-shaped winding and in locating said winding exactly on the inside of the turbine stator along the path of rotation of the specimen blade.

U.S. Pat. No. 3,058,339, issued Oct. 16, 1962, for "Vibration Detector and Measuring Instrument," and French Pat. No. 1,417,215 discloses a pulse m4thod for measuring oscillations, deflections and vibrations of rotating blades in operation. The principle of the pulse method is the measurement of the time interval from the instant that the shaft of the rotating part of the turbine or machine passes a specific predetermined angular position to the instant that a specific point of the specimen blade such as, for example, its end or tip, passes a specific predetermined point on the circular track or path of said blade. At the instant of passage of the tip of the specimen blade, an electrical pulse is produced by the measuring pickup device.

The initial instant for commencing the time interval is provided by a reference pickup device mounted on the stable or fixed part of the machine and a reference element mounted on the rotating part of the machine in a manner whereby said pickup device produces an electrical signal when the reference element passes the reference pickup device. The electrical signals produced by the measuring and reference pickup devices are supplied to a flip-flop circuit which produces an electrical output pulse. The duration of the output pulse of the flip-flop is equal to the length of the measured time interval. It is possible to determine from variations of the duration of he output pulse the magnitude of the deviation of the end or tip of the rotating blade in a plane perpendicular to the axis of rotation at the point of mounting of the measuring pickup device. The output electrical pulse produced by the measuring pickup device determines the instant of termination of the pulse produced by the flip-flop circuit which is also the instant of termination of the measured time interval.

The pulse method for measuring oscillations, deflections or vibrations of the ends of rotating blades described in the aforementioned U.S. and French patents is suitable for the measurement of oscillations, deflections or vibrations of a single rotating blade at one point of its path of rotation. If it is desired to measure the deviations, deflections, vibrations or oscillations of more than one rotating blade, it is necessary either to change the angular position of the reference pickup device or to delay the output signal produced by said reference pickup device by a delay circuit connected between the output of said reference pickup device and the input of the flip-flop circuit. It is, however, impossible to measure the deviations of more than one rotating blade at more than one point of the path of rotation.

The pulse method disclosed in the aforedescribed U.S. patent may provide measurement data for the amplitude and frequency of oscillations, deviations, vibrations or deflections only if the frequency of the deflections of the tip or end of the specimen rotating blade is at least four times less than the number of revolutions per second of the rotating part of the machine. If the frequency of the deviations of the tip of the specimen rotating blade is greater than four times the number of revolutions per second of the rotating machine part, the information or measurement data of the deflections at a single point of the rotary path is insufficient for a proper determination of the amplitude and frequency of deviation.

The principal object of the present invention is to provide new and improved apparatus for switching pulses in measuring the vibration of rotating parts during operation of a machine.

An object of the present invention is to provide apparatus for measuring the frequency of vibration, oscillation, deviation or deflection of the ends or tips of a plurality of specimen rotating blades of machines such as, for example, turbines, compressors, or the like, in a plane perpendicular to the axis of rotation, during prolonged operation of the machine, without the drawbacks of the known apparatus ad methods. The apparatus of the present invention utilizes a plurality of known arrangements of pickup devices each of which arrangements operates on the pulse principle for measuring deflections, deviations, oscillations or vibrations of the end of a specimen rotating blade, as described in the aforedescribed U.S. patent. The apparatus of the present invention improves upon these known arrangements to enable the simultaneous measurement of the deflections, deviations, vibrations or oscillations of the tips or ends of a plurality of rotating blades at several points on their path of rotation. The apparatus of the present invention provides a considerably greater amount of information or measurement data regarding the magnitude of deviation in the course of each revolution of the machine. This enables the evaluation of the amplitude and frequency of vibration of each rotating blade even when the frequency of the rotating blade is greater than one-fourth the number of revolutions per second of the machine. If a plurality of measuring pickup devices and the same number of reference pickup devices are mounted on the machine, and the output signals of the pickup devices are supplied to flip-flop circuits, considerable information data concerning the deviations of the specimen rotating blades at several points of the path of rotation is provided during the course of each revolution of the rotating part of the machine. Another advantage of the apparatus of the preset invention is that it permits the simultaneous measurement of deflections of a plurality of rotating blades affixed to a single rotating wheel of a turbine, compressor, or similar machine.

Another object of the present invention is to provide apparatus of simple structure, which is efficient, effective and reliable, for simultaneously measuring the deviations of a plurality of rotating blades on a single blade wheel of a turbine, compressor, or similar machine. The apparatus of the present invention has a broader field of application and is suitable everywhere that deviations of rotating components are to be measured during the course of operation of the machine of which such rotating components are a part.

An important advantage of the apparatus of the present invention is that no pickup devices for determining deviations, deflections, vibrations or oscillations, no electrical conductors and no modulated transmitters or similar sensitive components need be mounted on the rotating part of the machine. This reduces the cost of the apparatus. The electronic equipment, which is not mounted on the machine and which measures the deviations of the rotating blades, is of simple structure and comprises known electronic components. Thus, the apparatus of the present invention has a long service life and is suitable for normal operation of the machine or for laboratory conditions.

When a turbine, compressor, or similar machine is started, the apparatus of the present invention permits continuous measurement of the function of a plurality of selected blades and particularly the determination of the number of revolutions per second of the machine, when there are undesired deviations of such blades. During the continuous operation of the turbine, compressor or similar machine, the apparatus of the present invention provides a continuous measurement of the proper function of the rotating blades and the stress of such blades. The apparatus of the present invention also functions to measure the output of the machine subsequent to manufacture and prior to delivery and may determine if the rotating blades are strained, and thereby avoid future failures of the machine.

In accordance with the present invention, apparatus for switching pulses in measuring the vibration of rotating parts during operation of a machine which comprises rotating parts, stationary parts and N rotating parts to be measured, comprises N measuring pickup devices mounted on a stationary part of the machine. The rotating parts successively induce a pulse in each of the measuring pickup devices as they pass in operative proximity with each other. N reference elements are mounted on a rotary part of the machine. N reference pickup devices are mounted on a stationary part of the machine. The reference elements successively induce a pulse in each of the reference pickup devices as they pass in operative proximity with each other. Auxiliary elements are mounted on a rotary part of the machine. Auxiliary pickup devices are mounted on a stationary part of the machine. The auxiliary elements successively induce a pulse in each of the auxiliary pickup devices as they pass in operative proximity with each other. Each of N measuring systems is connected to a corresponding one of the measuring pickup devices and a corresponding one of the reference pickup devices for comparing the pulses produced by the pickup devices and providing an output pulse having an amplitude I when a pulse from a measuring pickup device coincides with a pulse from a reference pickup device. Each of the measuring systems has an output. A switching circuit has N outputs, a plurality of control inputs and N pulse inputs each connected to the output of a corresponding one of the measuring systems. A control circuit has a plurality of outputs each connected to a corresponding one of the control inputs of the switching circuit and a plurality of inputs each coupled to a corresponding one of the auxiliary pickup devices for controlling the operation of the switching circuit. The control circuit provides N output combinations having an output amplitude A during each revolution of the rotating parts of the machine in accordance with the pulses produced by the auxiliary pickup devices. The output combinations of the control circuit are supplied to the switching circuit via the control inputs of the switching circuit to control the operation of the switching circuit to supply a pulse having an output amplitude I of the $i^{th}$ measuring system to the $k^{th}$ or $N^{th}$ output of the switching system when $$k=1+i-j$$

when $$i \geq j$$

and $$k=N+1+i-j$$

when $i$ is $< j$, wherein $j$ is the ordinal number of the combination of output parts at the outputs of the control circuit having the output amplitude A, and $i$ and $j$ are numbers which increase incrementally from 1 to $N$ during each revolution of the rotating parts of the machine in a selected direction. The output pulses of the measuring systems having an amplitude I corresponding to one rotating part to be measured are supplied to one and the same output of the switching circuit.

The control circuit transforms the output combinations thereof having an output amplitude A to another output combination once in each time interval between next-adjacent successive pulses of each of the measuring systems having an output amplitude I.

The measuring pickup device and the reference pickup device of each measuring system are angularly spaced $\beta$ degrees from each other relative to the axis of rotation of the rotating parts of the machine. The angle $\beta$ is equal and of the same direction in all the measuring systems.

Each of the measuring systems comprises a flip-flop having an output connected to a pulse input of the switching circuit and a pair of inputs. Amplifier and shaper means couples the corresponding measuring pickup device to one input of the flip flop. Delay means and amplifier and shaper means are connected in series with each other and couple the corresponding reference pickup device to the other input of the flip-flop.

Each of the reference elements is angularly spaced $\beta$ degrees from the corresponding rotating part of the machine to be measured relative to the axis of rotation of the rotating parts of the machine. The angle $\beta$ is equal and of the same direction for each of the reference elements and each of its corresponding rotating parts to be measured.

Each of a plurality of amplifier and shaper means has an output connected to a corresponding one of the inputs of the control circuit and an input. Each of a plurality of delay means couples a corresponding one of the auxiliary pickup devices to the input of a corresponding one of the amplifier and shaper means.

In order that the present invention may be readily carried into effect, it will now be described wit reference to the accompanying drawings, wherein:

FIG. 3 is a view, partly in section, of components of the apparatus of FIG. 2 on an enlarged scale;

FIG. 4 is a view, on a considerably enlarged scale, of components of the apparatus of FIG. 2;

FIG. 5 is a schematic diagram, partly in section, of a pickup which may be utilized with the apparatus of the present invention;

FIG. 6 is a schematic diagram illustrating the mounting of a pickup device which may be utilized in the apparatus of the present invention;

FIG. 7 is a schematic diagram, partly in section, of another embodiment of a pickup device which may be utilized in the apparatus of the present invention;

FIG. 8 is a circuit diagram indicating the electrical connection of a pickup device of the apparatus of the present invention;

FIG. 9 is a circuit diagram of another embodiment of the electrical connection of a pickup device of the apparatus of the present invention;

FIG. 12 is a schematic diagram illustrating components and their positions in the apparatus of the present invention as utilized with a machine;

FIG. 21 is a circuit diagram of an embodiment of the control circuit of the apparatus of the present invention;

FIG. 22 is a graphical presentation illustrating a typical dependence of the current of a bistable two-pole element of the control circuit of FIG. 21 on the voltage on its input terminals;

FIG. 23 is a circuit diagram of an embodiment of a bistable two pole element of the control circuit of FIG. 21;

In the FIGS., the same components are identified by the same reference numerals.

Figure 1:
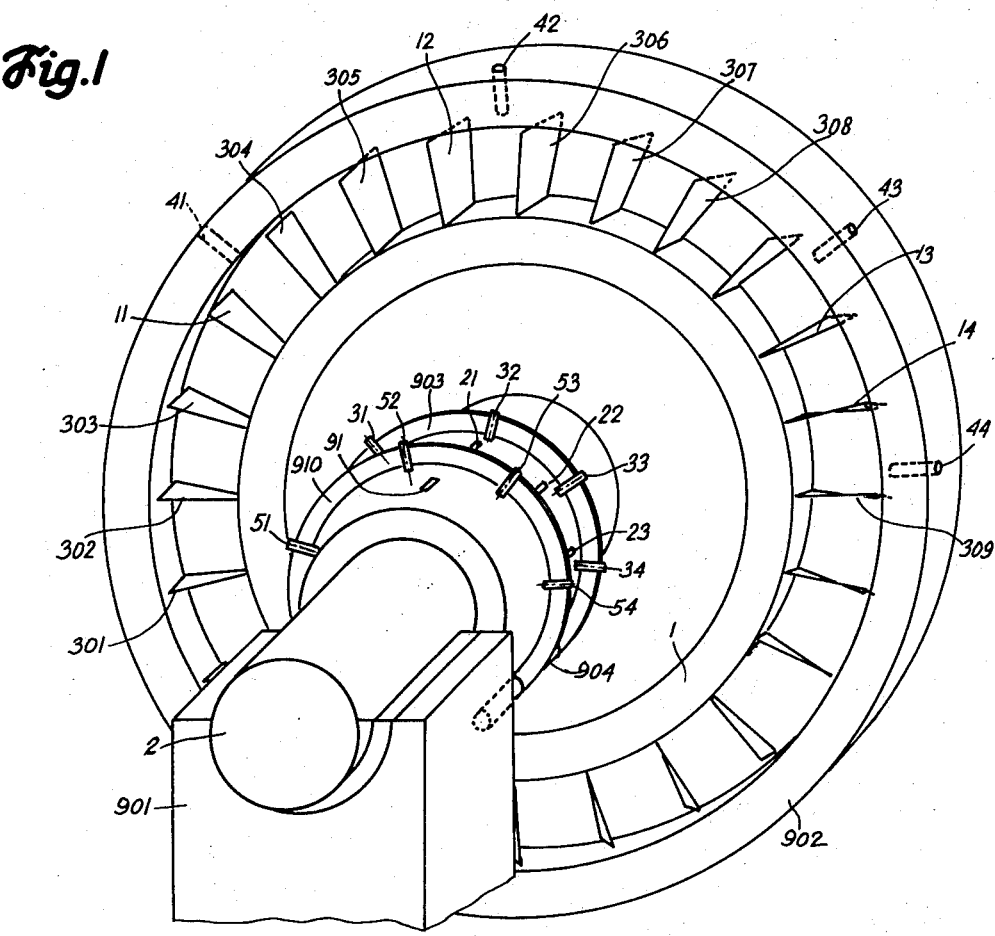
FIG. 1 is a perspective view of a machine which utilizes the apparatus of the present invention.

FIG. 1 is a view of impeller or turbine machinery having rotor blades extending from a rotor wheel mounted on a shaft. The shaft is rotated in bearings, only a portion of one bearing being shown. The cover of the turbine or machine is removed. The shaft is terminated by vertical section as if it is not connected to any other machine. Only part of the distributing wheel is shown, whereas in actuality said distributing wheel encompasses the entire impeller with its blades. The rear portion of the distributing wheel and the remaining mobile turbine parts are not showing since they are not important to a description of the present invention, and to maintain the clarity of illustration. For these reasons, the upper portion of the bearing and the lower portion of the impeller and distributing wheel are not shown.

Openings are shown cut in a distributing wheel for positioning the measuring pickup devices. Also shown are parts of mountings for the reference pickup devices and the auxiliary pickup devices which are in view. Part of a support for the pickup device mountings is also shown in FIG. 1. The reference elements are shown on the shaft and may be affixed to their mountings by any suitable means, not shown and not an object of the present invention. Furthermore in order to maintain the clarity of illustration, the electrical conductors connected to the auxiliary pickup devices, the reference pickup devices and the measuring pickup devices are not shown.

The machine shown in FIG. 1 comprises a stable, fixed or nonrotating part and a rotating or rotary part. The rotating part comprises a shaft 2 and a plurality of rotating wheels, one of which wheels 1 is shown in FIG. 1. Each of the rotating wheels is affixed to and rotates with the shaft 2. The shaft 2 is maintained in operating position by bearings, of which only the lower half 901 of one bearing is shown in FIG. 1.

Each of the rotating wheels has a plurality of blades 11, 12, 13, 14, 301, 302, 303, 304,...extending radially therefrom. A distributing wheel 902 is stationarily affixed to a machine support 905 (FIG. 3) in chose proximity with the tips or ends of the blades 11, 12,...301, 302,...

FIG. 3 is a sectional view taken in a plane passing through the axis of the turbine shaft. FIG. 3 illustrates the upper part of the distributing wheel 902, the impeller or rotating wheel 1, the packing, the reference device and the reference and auxiliary pickup device mountings. FIG. 3 discloses part of the shaft 2. The distributing wheel 902 is maintained in proper position by the machine support 905.

The distributing wheel 902 is stationary and does not rotate with the shaft 2. The upper part of the packing 931 is shown in FIG. 3. The cover of the machine, not shown in FIG. 3, is affixed to the packing 931.

Figure 2:
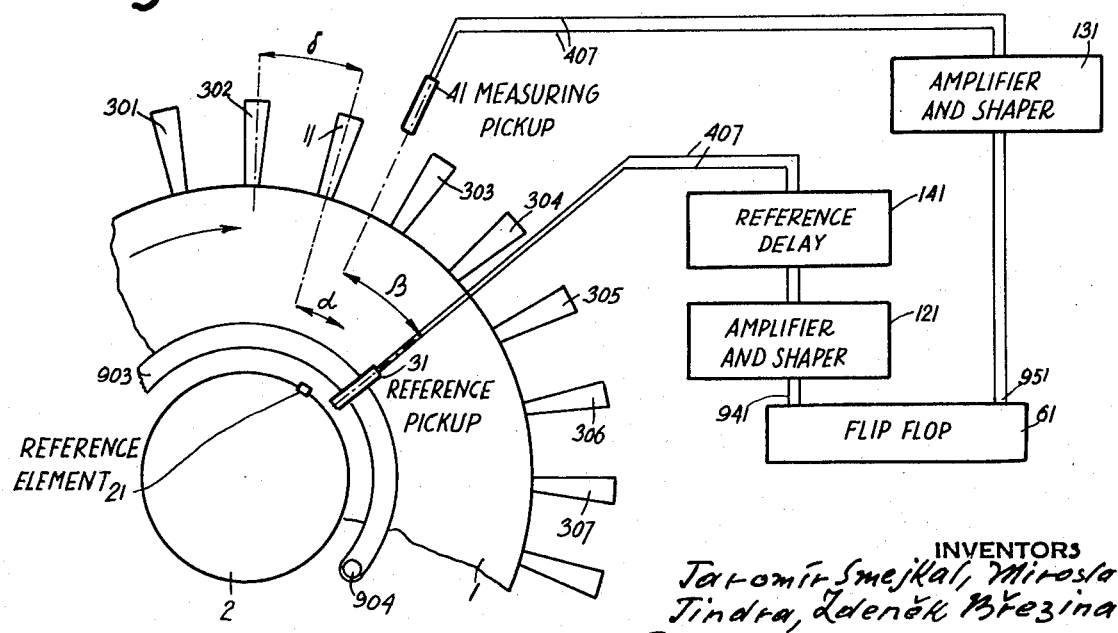
FIG. 2 is a schematic diagram of one unit of the apparatus of the present invention and the machine with which it is used.

FIG. 1 shows only that part of the distributing wheel 902 which surrounds the rotating wheel or impeller 1 and which has bores or openings formed therein for mounting measuring pickup devices 41, 42, 43 and 44. Since the operation of a turbine, compressor, or similar machine is well known and does not constitute part of the present invention, it is not herein described. In the actual operation of a turbine, compressor, or similar machine, the blades oscillate or vibrate so that the ends or tips thereof, sr other parts thereof, must be checked for variations or deflections. In order to accomplish this, a measuring pickup device 41 is positioned near the tips or ends of the blades 301, 302, ... and a reference pickup device 31 is positioned near a reference element 21 mounted on the surface of the shaft 2, as shown in FIG. 2. The pickup devices 41 and 31 are part of the measuring pulse system disclosed in U.S. Pat. No. 3,058,339.

FIG. 2 schematically represents the measuring pulse system disclosed in the aforedescribed patent. FIG. 2 does not shown the lower part of the distributing wheel, the lower part of the shaft, the auxiliary pickup devices, or their mountings. In FIG. 2, only one measuring pickup device 41 and only one reference pickup device 31 are shown, and the coupling means for fixedly mounting said pickup devices are not shown in order to maintain the clarity of illustration.

The measuring pulse system shown in FIG. 2 operates in the manner described in the aforedescribed U.S. patent to provide information concerning deviations, deflections, vibrations or oscillations of a blade at a point in the rotary path of the blade, during each revolution of the rotating wheel. The apparatus of the present invention combines a plurality of measuring pulse systems to provide a considerable amount of information concerning the vibrations, oscillations, deviations or deflections of a plurality of blades simultaneously at a plurality of points in their rotary path, during each revolution of the rotating wheel. In accordance with the present invention, each individual measuring pulse system is controlled by an auxiliary element mounted on the surface of the shaft, a fixedly mounted auxiliary pickup device, a control circuit and a switching circuit, as hereinafter described, and not shown in FIG. 2.

In FIG. 2, the reference element 21 is affixed to the surface of the shaft 2 in a manner whereby during the rotation of said shaft, said reference element passes in proximity with the lower portion of the reference pickup device 31 which is fixedly mounted in operative proximity with said shaft. This is further illustrated in FIG. 4 which shows the reference pickup device 31 and two reference elements 21 and 22. FIG. 4 illustrates two different methods of mounting a reference element to the surface of the shaft 2; the reference element 21 being mounted in one manner and the reference element 22 being mounted in another manner. The section of the shaft indicated is a portion of a perpendicular plane through the axis of the shaft.

The reference elements 21 and 22 of FIG. 4 may comprise any suitably shaped steel bands or prisms and may be welded to the surface of the shaft 2 or mounted on the surface of the shaft 2 by any suitable means. Thus, for example, the reference element 22 is shown in FIG. 4 as being welded to the surface of shaft 4, whereas the reference element 21 is shown as being clamped to the surface of said shaft. The reference element 21 or 22 passes under the lower part or end of the reference pickup device 31 in the course of rotation of the shaft and at the instant of passage, said reference pickup device produces an electrical pulse, hereinafter described.

FIG. 6 is a view, partly in section, taken in a plane perpendicular to the axis of the shaft of the machine, and is a view from the bottom looking up in the axial direction of the reference pickup device. The reference pickup device 31 is affixed to the reference pickup mount 903, as shown in FIG. 6. The reference pickup device 31 may be affixed to the mount 903 by any suitable method such as, for example, that shown in FIG. 6, wherein said reference pickup device is mounted in a sleeve 421 which is affixed by nuts and bolts 422 passing through apertures 423 formed through the mount 903. The mounting arrangement illustrated in FIG. 6 permits the adjustment of the position of the reference pickup device 31 relative to the reference element 21.

In FIG. 2 the mount 903 is illustrated in a simplified manner in order to maintain the clarity of illustration. The reference pickup device mount 903 remains stationary during the course of rotation of the shaft 2 and is mechanically affixed to a stationary machine part. Thus, the mount 903 may be affixed to a support member 904 which in turn is affixed to the lower part of the bearing 901 as shown in FIG. 1.

Figure 11:
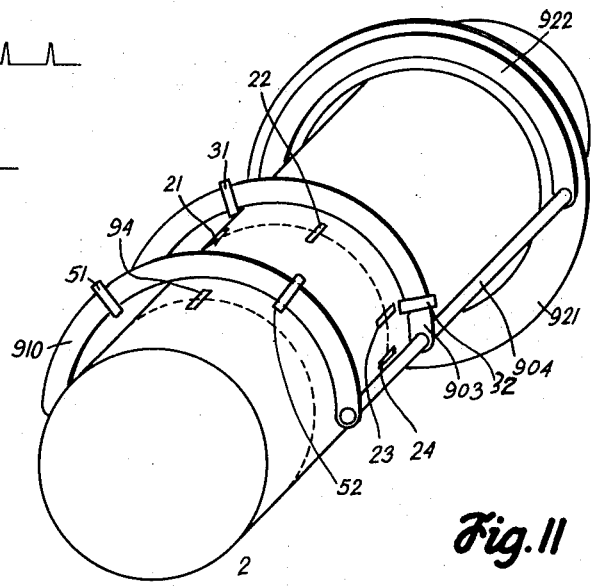
FIG. 11 is a perspective view of a mounting arrangement for components of the apparatus of the present invention.

An arrangement for affixing the reference pickup device mount 903 to the stationary machine part is illustrated in FIG. 11. In FIG. 11 the support member 904 is affixed to an adjustable member 922. The reference pickup device mount 903 is affixed to the support member 904.

The support member 904 is affixed to the adjustable member 922 in a manner whereby said support member may rotate with said adjustable member as said adjustable member is securely positioned on a ring 921. The adjustable member 922 may thus be shifted in angular position on its supporting ring 921 in order to vary the angular position of the reference pickup devices 31 and 32 while maintaining the distance of said reference pickup devices from the surface of the shaft. This insures that each of the reference elements 21, 22, 23 and 24 affixed to the shaft 2 passes in succession in close proximity with the lower part of each reference pickup device 31 and 32 during the course of rotation of said shaft. The support ring 921 is affixed to a stationary part of the machine in any suitable manner.

The measuring pickup device 41 is mounted on a stationary part of the machine. The measuring pickup device 41 may thus be mounted in a bore formed in the distributing wheel 902, as shown in FIGS. 5 and 7. The measuring pickup device 41 may also be mounted in a sleeve 421, as shown in FIG. 6, with reference to the reference pickup device. Each measuring pickup device 41, 42, 43,...is positioned and mounted in a manner whereby in the course of rotation of the rotating wheel 1, the ends or tips of the specimen blades 11, 12,...301, 302,...pass in close proximity with the lower part or end of each of said measuring pickup devices. This results in each of the measuring pickup devices 41, 42,...producing an electrical pulse at the instant that each blade 11, 12,...passes its lower end.

FIG. 5 is a sectional view in a plane through the axis of the shaft and illustrates an electromagnetic type of measuring pickup device. FIG. 5 includes a part of the distributing wheel 902 and the end or tip part of the blade 11. FIG. 7 is a sectional view in a plane passing through the axis of the shaft and illustrates a measuring pickup device of capacitance type. Part of the distributing wheel 902 and the end or tip part of a blade 11 are shown in FIG. 7.

In FIG. 5, the measuring pickup device is mounted in a bore formed in the distributing wheel 902. The bore extends in substantial radial direction relative to the shaft of the machine (not shown in FIG. 5). The electromagnetic type measuring pickup device shown in FIG. 5 comprises a magnetic circuit having a tube 405, a cover plate 408, a core 410 and a winding 409. Electrical conductors 407 are connected to the terminals of the winding 409 for energizing said winding and are protected from damage by being sealed or potted in a sealing compound 403 and by a protective plate 404. The proper position of the measuring pickup device in the bore is secured by a bearing plate 402 and a nut 406 which is in threaded engagement with threading formed on the inside of part of the bore.

The capacitance-type measuring pickup device shown in FIG. 7 comprises an electrode 414 inserted in a bore formed in the distributing wheel 902. The electrode 414 is maintained in proper position by an upper insulating member 412, a lower insulating member 413, a bearing plate 402 and a nut 406 in threaded engagement with threading formed on the inside of part of the bore. An electrical supply conductor 407 is connected to one end of the electrode 414.

A magnetic field is produced at the lower end of the electromagnetic type measuring pickup device of FIG. 5 due to the utilization of a permanent magnet as the core 410 or the supply of direct current to the winding 409 for energizing said winding. Direct current may be supplied to the winding 409 of the electromagnetic type measuring pickup device in the manner shown in FIG. 9. When the blade 11 passes the lower extremity of the measuring pickup device of FIG. 5, it changes the shape and intensity of the magnetic field and results in the production of an electrical pulse in the winding 409.

FIG. 8 illustrates a circuit arrangement for connecting an amplifying and shaping circuit or amplifier and shaper 121 to the winding 409 of the electromagnetic type pickup device. The amplifier and shaper 121 is connected to the winding 409 via a coupling capacitor 121. When the circuit arrangement of FIG. 8 is utilized, the core 410 of the measuring pickup device is a permanent magnet. The electrical pulse produced by the measuring pickup device of FIG. 8 is supplied to the amplifier and shaper 121 which functions to amplify and shape said pulse. The amplifier and shaper 121 may comprise any suitable circuitry for accomplishing this result.

FIG. 9 is a circuit arrangement for supplying the winding 409 of the electromagnetic type measuring pickup device with direct current from a source 181 of direct current. The source of direct current 181 is connected to the winding 409 of the measuring pickup device via a supply choke 171 and a resistor 161 connected in series circuit arrangement with said source and said winding. The amplifier and shaper 121 is connected to the winding 409 via electrical conductors 407, as in FIG. 8, and the coupling capacitor 191 as in FIG. 8. In the arrangement of FIG. 9, the core 410 comprises magnetically soft material.

The capacitance-type measuring pickup device shown in FIG. 7 is energized from a source of supply voltage (not shown in FIG. 7) via the electrical conductor 407. The supply voltage produces an electrostatic field around the lower end or extremity of the electrode 414. The intensity and shape of the electrostatic field is changed at the instant the blade passes the end of the electrode 414. At such instant, an electrical pulse is produced by the measuring pickup device and is transferred to the electrical conductor 407.

The reference pickup device 31 may be the same as the measuring pickup device 41 and may be in the same manner, with the exception that the reference pickup device produces an electrical pulse when the reference element 21 passes in close proximity with its lower end, as shown in FIG. 4. The measuring and reference pickup devices need not be of either disclosed type, of course, but may comprise any suitable type for accomplishing the desired results. The measuring and reference pickup devices may also be connected to different electrical circuits of any suitable type. The only requirement is that an electrical pulse be produced at the instant that a blade passes the lower end of the measuring pickup device or at the instant that a reference element passes the lower end of the reference pickup device.

As hereinbefore mentioned, FIG. 2 illustrates the positions and relationship of the measuring pickup device 41, the reference pickup device 31 and the reference element 21. As shown in FIG. 2, the measuring pickup device 41 is spaced from the reference pickup device 31 by an angle β. The blade 11 and the reference element 21 are spaced from each other by an angle α. The axes of next-adjacent blades such as, for example, the blades 302 and 11, are spaced from each other by an angle γ.

The positions of the measuring pickup device 41 and the reference pickup device 31 are so selected that in the course of rotation of the rotating wheel in clockwise direction, as indicated by the arrow, a pulse is produced in the reference pickup device 31 before it is produced in the measuring pickup device 41 due to the rotating blade 11. The reference pickup device 31 is connected to a reference delay 141 via the electrical conductors 407. The reference delay 141 may comprise any suitable delay circuit. If the reference delay 141 is adjusted for a zero delay of the pulse produced by the reference pickup device 31, it fulfills the condition that α is greater than β.

In order to maintain the simplicity and clarity of illustration, it is assumed that each of the measuring pickup device 41 and the reference pickup device 31 has a rod-shaped permanent magnet as its core 410 (FIG. 5), so that there is no need for a supply or energizing circuit. The coupling capacitors 191 are omitted from FIG. 2 for the same reason. The reference delay 141 delays an electrical pulse supplied to its input from the reference pickup device 31 for any adjustable time interval. The output of the reference delay 141 is connected to the input of the amplifier and shaper 121. The output of the amplifier and shaper 121 is connected to a first input 941 of a flip-flop 61 which may comprise any suitable bistable multivibrator or similar circuit arrangement. The measuring pickup device 41 is connected to the input of another amplifier and shaper 131 via electrical conductors 407. The output of the amplifier and shaper 131 is connected to a second input of the first flip flop 61.

The circuit arrangement of FIG. 2 may be varied, so that the reference pickup device 31 is connected to the input of the amplifier and shaper 121 and the output of said amplifier and shaper is connected to the flip flop 61 via the reference delay 141. It is also possible to connect the delay circuit in the circuit path of the pulse provided by the measuring pickup device, rather than that provided by the reference pickup device 31. Each of the amplifier and shaper circuits 121 and 131 may comprise any suitable amplifying and shaping circuit for forming or shaping the electrical pulses produced by the corresponding pickup devices to a magnitude and shape suitable for proper operation of the flip-flop 61.

Figure 10:
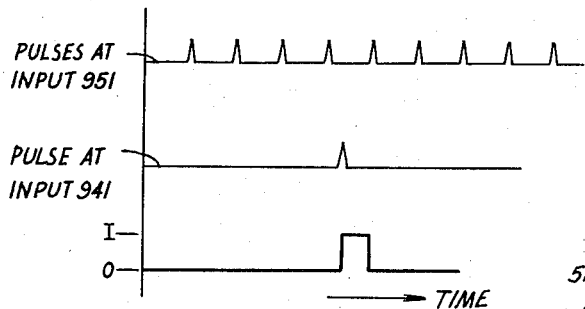
FIG. 10 is a graphical presentation of the output signals produced by the pickup devices of the apparatus of the present invention.

FIG. 10 illustrates the operation of the flip-flop circuit 61. In FIG. 10, the abscissa represents time and the ordinate represents amplitude. The uppermost curve of FIG. 10 illustrates a plurality of pulses supplied to the second input 951 of the flip-flop 61. The pulses at the second input 951 correspond to the instants that the rotating blades 301, 302,...and the specimen rotating blade 11 pass the measuring pickup device 41.

The center curve of FIG. 10 shows the pulse supplied to the first input 941 of the flip flop 61. This pulse is produced at the instant that the reference element 21 passes the reference pickup device 31. The position of the pulse of the center curve relative to time is thus determined by the adjustment of the delay circuit 141. The bottom curve of FIG. 10 illustrates the output voltage or current of the flip flop circuit 61. The output signal of the flip flop 61 changes from zero amplitude to an amplitude I at the instant that a pulse is supplied to the first input 941 of said flip-flop. The output signal maintains the amplitude I until the instant that the next pulse is supplied to the second input 951 of the flip-flop 61, as shown in FIG. 10. Additional pulses, supplied to the second input 951 of the flip-flop 61, do not influence the zero level of the output voltage or current of said flip-flop.

If the end, tip, or other part, of the specimen rotating blade 11 is deflected from its mean or average position, the instant of production of an electrical pulse by the measuring pickup device 41 is shifted in time. This causes a shift in time of the instant that the amplitude of the output signal of the flip flop 61 changes from I to zero. The duration of the interval during which the output signal of the flip-flop 61 maintains the amplitude I thus changes, and in accordance with its change, the magnitude of the deflection of the rotating blade is evaluated by suitable electrical components. The evaluating components are not part of the measuring system of the present invention and are not disclosed or described herein.

Figure 13:
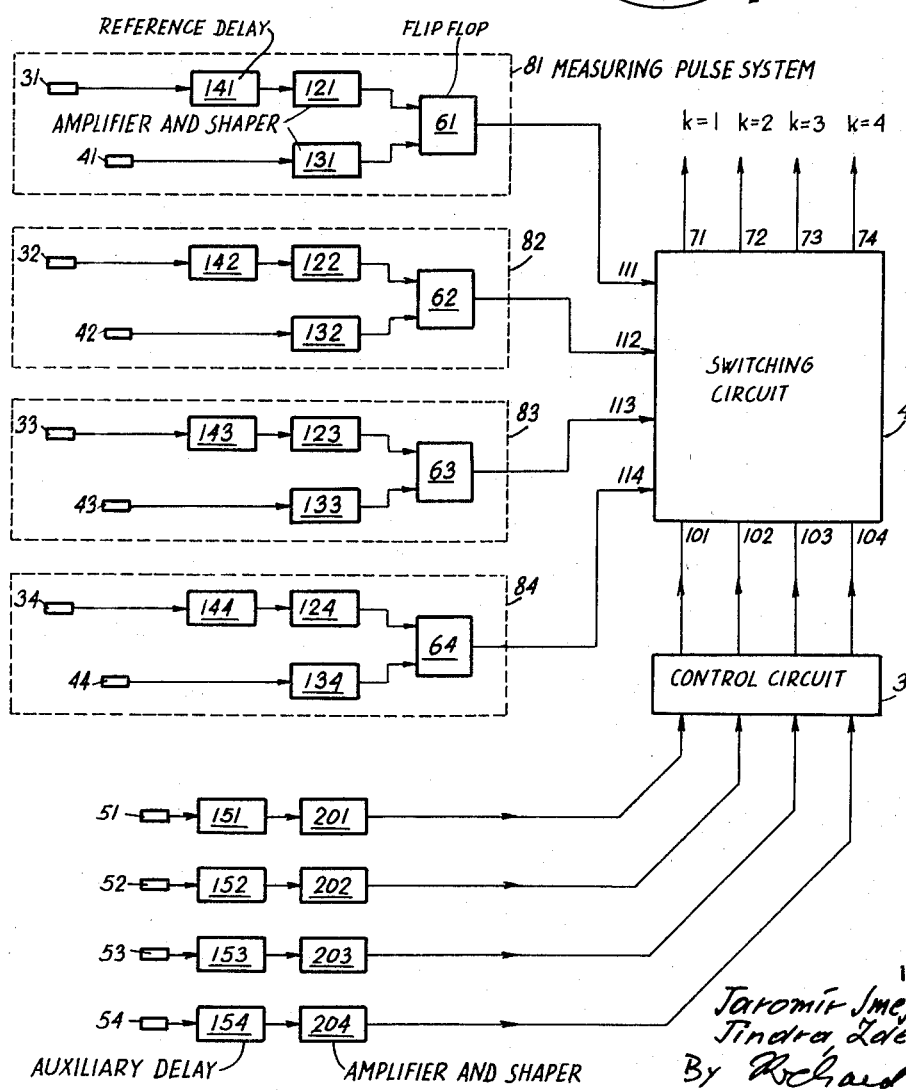
FIG. 13 is an electrical block diagram illustrating the electrical circuit of the apparatus of the present invention.

The measuring pulse system hereinbefore described is that disclosed in U.S. Pat. No. 3,058,339. In accordance with the present invention, a plurality of measuring pulse systems of the type disclosed in the aforedescribed U.S. patent are combined and simultaneously utilized for measuring deflections, deviations, vibrations or oscillations of rotating blades. Electrical pulses having an amplitude I are provided at the output of each measuring pulse system and correspond to the specimen rotating blades 11, 12,...passing the measuring pickup devices 41, 42,... As shown in FIG. 13, the outputs of the measuring pulse systems 81, 82,...are connected to pulse inputs 111, 112,..., respectively, of a switching circuit 4 (FIG. 13).

The switching circuit 4 is controlled in operation by a control circuit 3 (FIG. 13) in a manner whereby $$k=1+i-j \quad (1)$$

when $$i \geq j$$

and $$k=N+1+i-j \quad (2)$$

when $i<j$, wherein $N$ is the number of measuring pulse systems in the apparatus of the present invention. The value $k$ of equation (2) is the ordinal number of the output 71, 72,...of the switching circuit 4 and is also the number of specimen blades 11, 12,..., which are aligned in their path of rotation. Thus, when the specimen blades follow their path of rotation, the individual rotating specimen blades 11, 12, ... are numbered by ordinal numbers $k=1, 2,...N$.

The value $i$ of equation (2) is the ordinal number of the measuring pulse systems 81, 82,..., which are aligned so that in the course of rotation any rotating blade 301, 302,...first passes the measuring pickup device 41 of the measuring pulse system 81, identified as $i=1$ and subsequently passes the measuring pickup device 42 of the measuring pulse system 82, identified as $i=2$, and so on. The value $j$ in equation (2) indicates the condition of the switching circuit 4 and the control circuit 3 of FIG. 13.

The value $j$ increases from 1 to $N$ during the course of each revolution of the rotating wheel 1 (FIG. 12), so that the variation of the value $j$ increases only in time intervals wherein the output signal level is simultaneously zero for all the measuring pulse systems 81, 82,... The value $j$ never changes during the course of the time intervals wherein the output signal of at least one of the measuring pulse systems 81, 82,...has an amplitude I. The value $j$ increases in increment, however, in each time interval during which some of the specimen blades 11, 12,...pass from one measuring pickup device 41, 42,...to the next-succeeding measuring pickup device. This results in the information regarding deflections of each specimen rotating blade always being provided in the same final output.

FIG. 12 illustrates the positioning of the pickup devices relative to the blades and the surface of the shaft in a plane perpendicular to the axis of the shaft. The pickup device mounts or mountings and the distribution wheel are not shown in FIG. 12 in order to maintain the clarity of illustration. The reference elements are indicated as being mounted on the larger diameter of the shaft, whereas the auxiliary elements are indicated as being mounted on the smaller diameter of the shaft; the shaft being indicated as having a shoulder. FIGS. 12 and 13 illustrate the apparatus of the present invention for 4 measuring pulse systems 81, 82, 83 and 84. In the apparatus shown in FIGS. 12 and 13, $N$ is thus 4. During the course of rotation, each specimen rotating blade 11, 12, 13 and 14 first passes the measuring pickup device 41, then passes the measuring pickup device 42, then passes the measuring pickup device 43, and then passes the measuring pickup device 44. The specimen rotating blade 11 is identified as $k=1$, the specimen rotating blade 12 is identified as $k=2$, the specimen rotating blade 13 is identified as $k=3$, and the specimen rotating blade 14 is indicated as $k=4$.

In FIG. 12, an auxiliary reference element 91 is mounted on the smaller diameter portion of the shaft 2. During the rotation of the shaft 2, the auxiliary reference element 91 passes a plurality of auxiliary pickup devices 51, 52, 53 and 54. The auxiliary reference elements 21, 22, 23 and 24 are mounted on the larger diameter portion of the shaft 2. During the course of rotation of the shaft 2, each reference element 21, 22, 23 and 24 passes the lower end or extremity of each reference pickup device 31, 32, 33 and 34.

The reference elements 21, 22, 23 and 24 are positioned sufficiently far from the auxiliary pickup devices 51, 52, 53 and 54 so that no electrical pulses are generated in said auxiliary pickup devices by the passage of the reference elements. The auxiliary element 91 is so positioned on the shaft 2 that in the course of rotation of said shaft, said auxiliary element passes in close proximity with the lower extremity of each of the auxiliary pickup devices 51, 52, 53 and 54 and produces in said auxiliary pickup devices electrical pulses. The auxiliary element 91 is sufficiently spaced from the reference pickup devices 31, 32, 33 and 34 so that it does not induce electrical pulses in said reference pickup devices. It is for these reasons that the reference elements 21, 22, 23 and 24 and the auxiliary element 91 are positioned on different-diameter portions of the shaft 2, and the auxiliary pickup devices 51, 52, 53 and 54 are positioned on a circle of smaller diameter than that on which the reference pickup devices 31, 32, 33 and 34 are positioned.

In FIG. 13, the reference pickup devices 31 to 34, the measuring pickup devices 41 to 44 and the auxiliary pickup devices 51 to 54 are shown in three separate rows in order to maintain the clarity of illustration. The outputs of the individual flip-flop circuits 61 to 64 are the outputs of the measuring pulse systems 81 to 84, respectively. The auxiliary pickup devices 51 to 54 are the same as, and operate in the same manner as, the measuring pickup devices and the reference pickup devices. The auxiliary reference element 91 (FIG. 12) is of the same configuration and arrangement as the reference elements 21 to 24 (FIG. 12).

The auxiliary pickup devices 51 to 54 are connected to the inputs of auxiliary delay circuits 151 to 154, respectively. The auxiliary delay circuits or auxiliary delays operate in the same manner as the reference delay circuits 141 to 144 of the measuring pulse systems 81 to 84, respectively. The outputs of the auxiliary delay circuits 151 to 154 are connected to the inputs of auxiliary amplifiers and shapers or amplifying and shaping circuits 201 to 204, respectively. The outputs of the auxiliary amplifiers and shapers are connected to corresponding inputs of the control circuit 3.

The auxiliary delay circuits 151 to 154 are simultaneously adjusted with the reference delay circuits 141 to 144 during the measuring operation. The auxiliary amplifying and shaping circuits 201 to 204 are any suitable circuits for forming or shaping the electrical pulse produced by the auxiliary pickup devices 51 to 54 to a shaping and magnitude which is proper for the operation of the control circuit 3. It is possible to connect the auxiliary pickup devices 51 to 54 to the inputs of the auxiliary amplifiers and shapers 201 to 204 and to connect the outputs of said amplifiers and shapers to the input control circuit 3 via the auxiliary delay circuits 151 to 154.

The auxiliary pickup devices 51 to 54 are mounted on a mount or mounting 910 for said auxiliary pickup devices in a manner similar to that in which the reference pickup devices 31 to 34 are mounted on the mount or mounting 903 for the reference pickup devices (FIGS. 1, 6 and 11). The mount 910 for the auxiliary pickup devices is firmly affixed to the mount 903 for the reference pickup devices by the support member 904 (FIGS. 1 and 11). Thus, if the mount 903 is moved in angular position, the mount 910 is simultaneously moved the same amount, due to the support of the support members by the ring 921.

Figure 16:
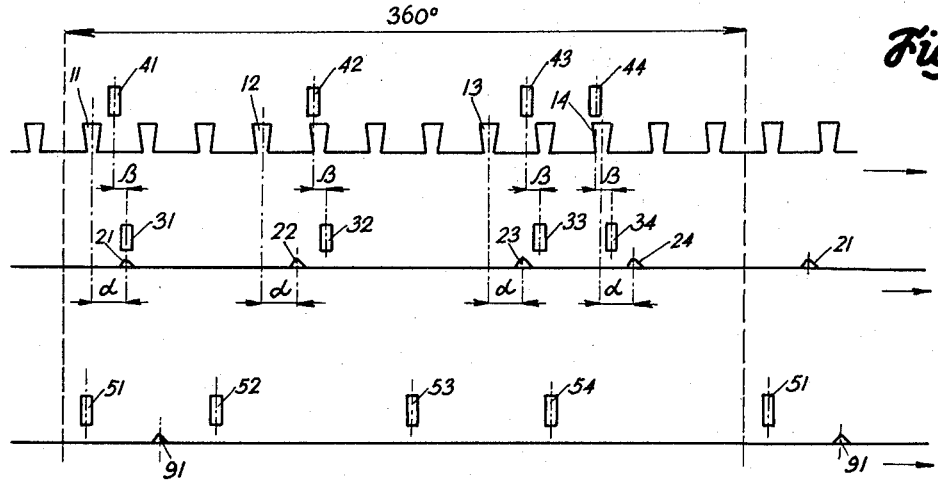
FIG. 16 is a developed presentation of components of the apparatus of the present invention in their relation to the machine with which they are used.
Figure 17:
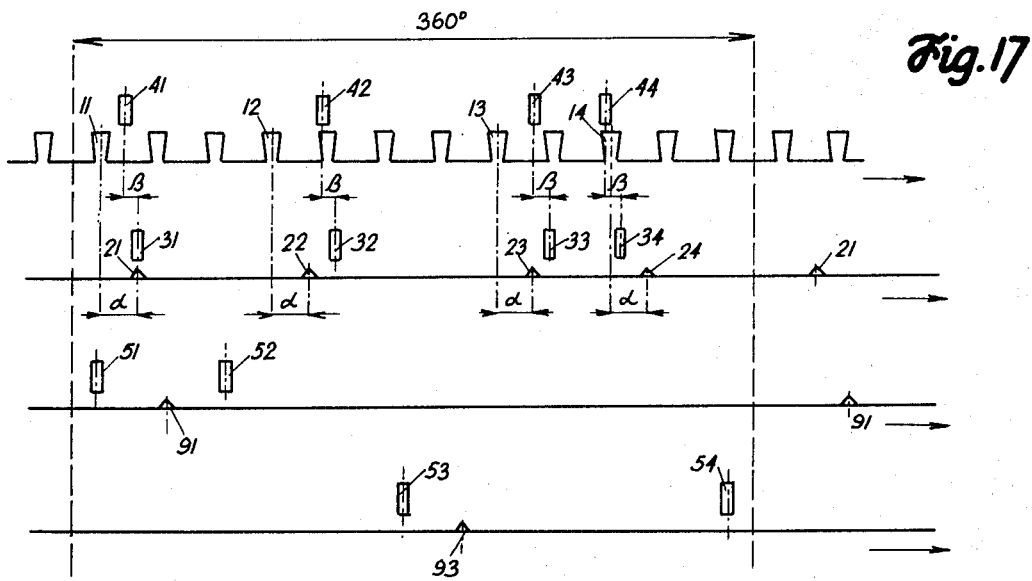
FIG. 17 is a developed presentation of components of the apparatus of the present invention in their relation to the machine with which they are used and includes more components than does FIG. 16.

The arrangement of the components of the apparatus of the present invention is clearly set forth in the developed view of FIG. 16 which represents such components in rows. The blades and elements simultaneously move to the right, in FIG. 16, as shown by the arrows. The pickup devices remain stationary. The developed view of FIG. 17 is that of FIG. 16 with the addition of the auxiliary reference elements 92 and 93. The auxiliary pickup devices 53 and 54 are shown in a separate row from the auxiliary reference pickup devices 51 and 52.

Figure 18:
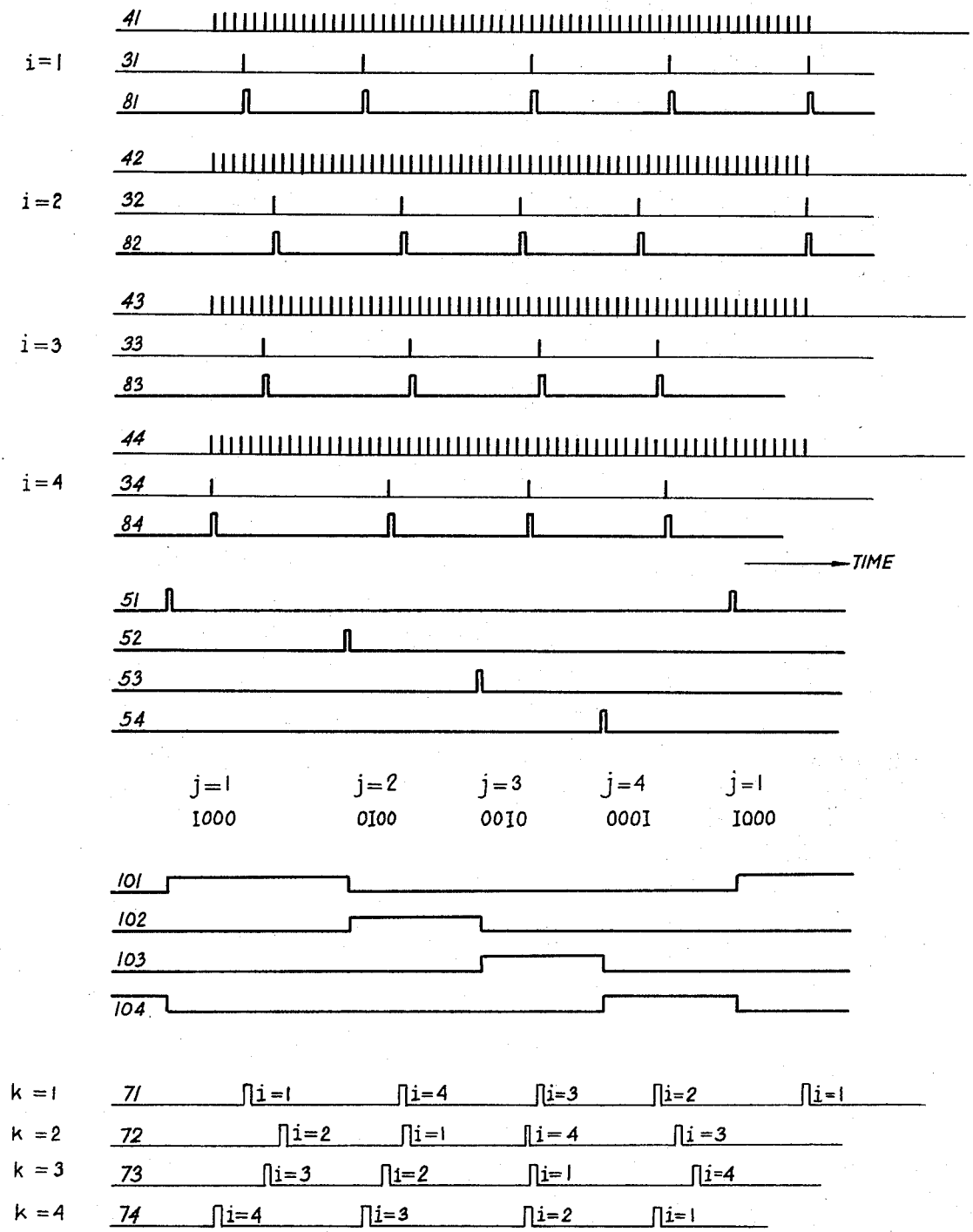
FIG. 18 is a graphical presentation of the pulses produced by the apparatus of the present invention.
Figure 19:
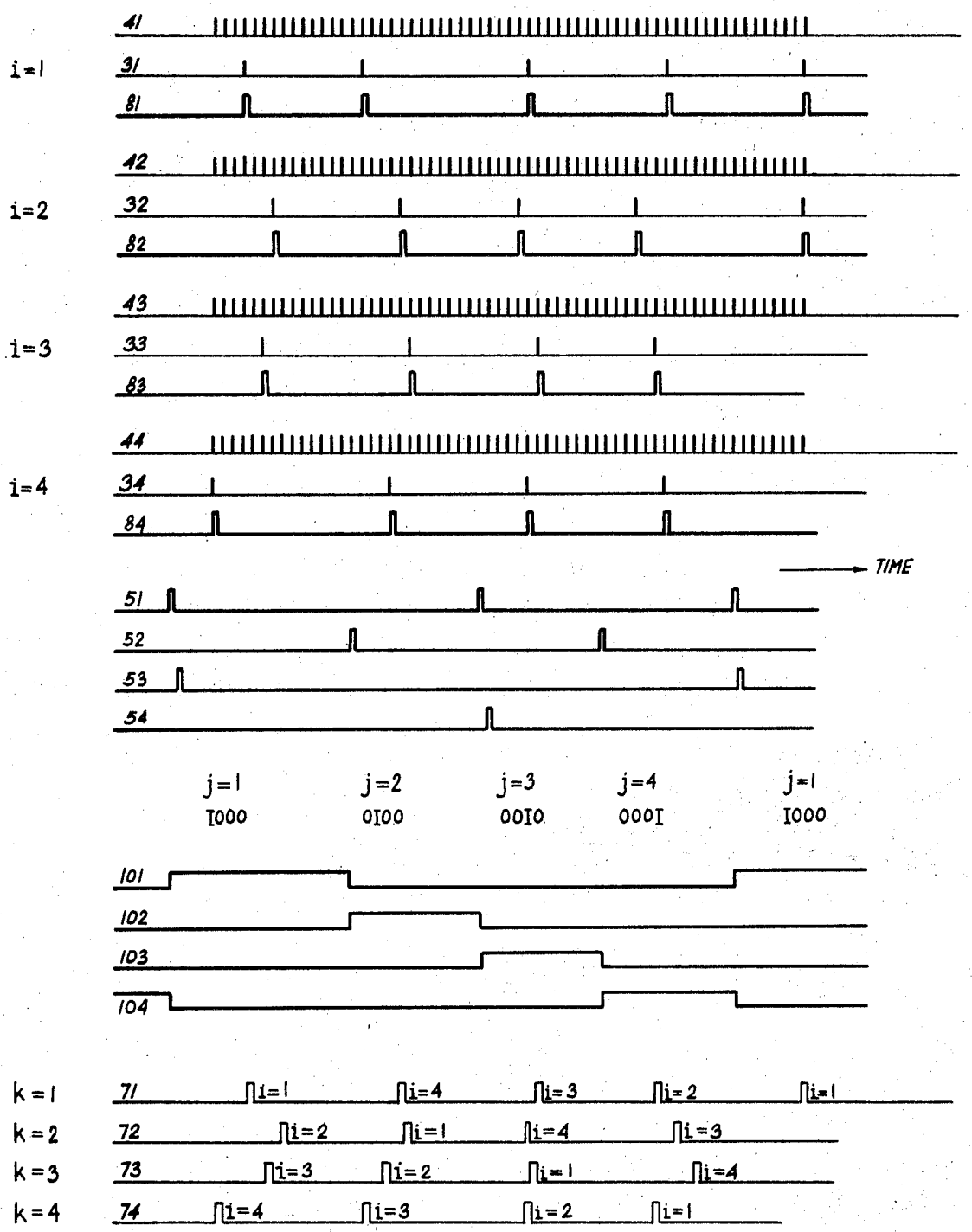
FIG. 19 is a graphical presentation of the pulses produced by the apparatus of the present invention and includes pulses produced by more components than those represented in FIG. 18.

FIG. 18 is a time diagram illustrating the operation of the apparatus of the present invention and corresponds to the distribution of components in the developed condition shown in FIG. 16. FIG. 19 is a time diagram illustrating the operation and corresponds to the distribution of components in the developed condition shown in FIG. 17. In FIG. 18, the individual pulses are simplified as if the reference delay circuits 141 to 144 and the auxiliary delay circuits 151 to 154 are adjusted to provide a zero delay. In each of FIGS. 18 and 19, the abscissa of each curve represents time and the ordinate represents amplitude.

In FIG. 18, as in FIG. 19, the output pulses of the four measuring pulse systems 81 to 84 are shown and identified as $i=1$, $i=2$, $i=3$ and $i=4$. Each measuring pulse system includes its corresponding measuring pickup device 41, 42, 43 and 44, respectively, and its corresponding reference pickup device 31, 32, 33 and 34, respectively. Each abscissa is numbered in accordance with the pickup device or measuring pulse system to which it belongs. Beneath the four pulse measuring systems 81 to 84, are illustrated the pulses produced by the auxiliary pickup devices 51, 52, 53 and 54.

In each of FIGS. 18 and 19, the values of $j=1$, $j=2$, $j=3$ and $j=4$ are illustrated beneath the illustration of the auxiliary pickup device pulses. The values of $j$ indicate the condition of the control circuit 3 and the switching circuit 4. Beneath the indications of the values $j$, the amplitudes of the output current or voltage of the control circuit 3 are illustrated. Each individual output control signal 101, 102, 103 and 104 of the control circuit 3 is shown at the bottom of FIGS. 18 and 19.

At the very bottom of each of FIGS. 18 and 19, the final output signals of the switching circuit 4 are illustrated. The final output signals 71, 72, 73 and 74 of the switching circuit 4 are indicated by the values of $k=1$, $k=2$, $k=3$ and $k=4$. The individual pulses in each of the outputs 71 to 74 are indicated by the value $i$ in order to show which measuring pulse system produced them.

FIGS. 18 and 19 provide an immediate indication of the instants of occurrences of changes in the condition of the control circuit 3 and in the condition of the switching circuit 4. As indicated by these FIGS., pulses containing information about deflection, deviation, vibration or oscillation of individual specimen blades appear in the final outputs 71 to 74 of the switching circuit 4. Thus, pulses for each specimen rotating blade are permanently provided in corresponding ones of the final output signals 71 to 74. Further processing of the final output pulses, that is, the determination of the actual deflection or deviation of the blades, does not constitute part of the present invention and is not shown or described herein. Suitable apparatus for such processing is shown and described in the aforedescribed U.S. patent.

The control circuit 3 functions to differentiate positively by its output signals $N$ conditions, when the instants of commencement and termination are determined by pulses produced by the auxiliary pickup devices 51 to 54. In the example of FIGS. 18 and 19, which describes the operation of four measuring pulse systems, the control circuit 3 has four outputs and is controlled in accordance with which of the outputs has an output voltage or current amplitude of 1, the remaining outputs having an output current or voltage amplitude of zero. In symbolic form, in accordance with FIGS. 18 and 19, the conditions of the output signal amplitudes may be indicated, as shown by 1000, 0100, 0010 and 0001.

It is also possible, however, to provide the control circuit with a different number of outputs from four. The control circuit may have, for example, two outputs, so that the four different conditions are differentiated as 00, 01, 10, and 11. Other methods of differentiation are possible, of course, for expressing the conditions of the output signals of the control circuit. The only requirement is to indicate positively the condition of the switching circuit 4 by the conditions of said control circuit.

The switching circuit 4 functions to transmit electrical signals from its signal inputs 111 to 114 to its final outputs 71 to 74. The function of the delay circuits 141 to 144 and 151 to 154, as shown in FIG. 13, is to enable, during the course of operation of the machine, the measurement of deflections or deviations of other rotating blades by varying the time delay.

The auxiliary pickup devices may be arranged in a manner whereby a plurality of auxiliary reference elements affixed to the surface of the shaft are positioned in a plurality of rows, a specific row of auxiliary pickup devices corresponding to each row of auxiliary reference elements. It is possible, for example, in utilizing the four measuring pulse systems of FIG. 13, to mount two auxiliary reference elements 91 and 92 on the shaft 2 in a manner whereby during the course of rotation, each auxiliary reference element passes in close proximity with the lower extremity of each of the auxiliary pickup devices 51 and 52. Each of the auxiliary pickup devices 51 and 52 produces an electrical pulse at the instant that an auxiliary reference element passes in close proximity with it, and no electrical pulse is produced in either auxiliary pickup device 53 or 54 or any reference pickup devices 31 to 34. An auxiliary reference element 93 is mounted at another point on the surface of the shaft 2 in a manner whereby it passes, during rotation, in close proximity with the lower extremities of the auxiliary pickup devices 53 and 54 and induces in said auxiliary pickup devices electrical pulses. Neither of the auxiliary pickup devices 51 and 52 or the reference pickup devices 31 to 34 produces an electrical pulse in this instance. FIG. 17 illustrates the positioning of the auxiliary reference elements and the auxiliary pickup devices in developed rows.

Figure 20:
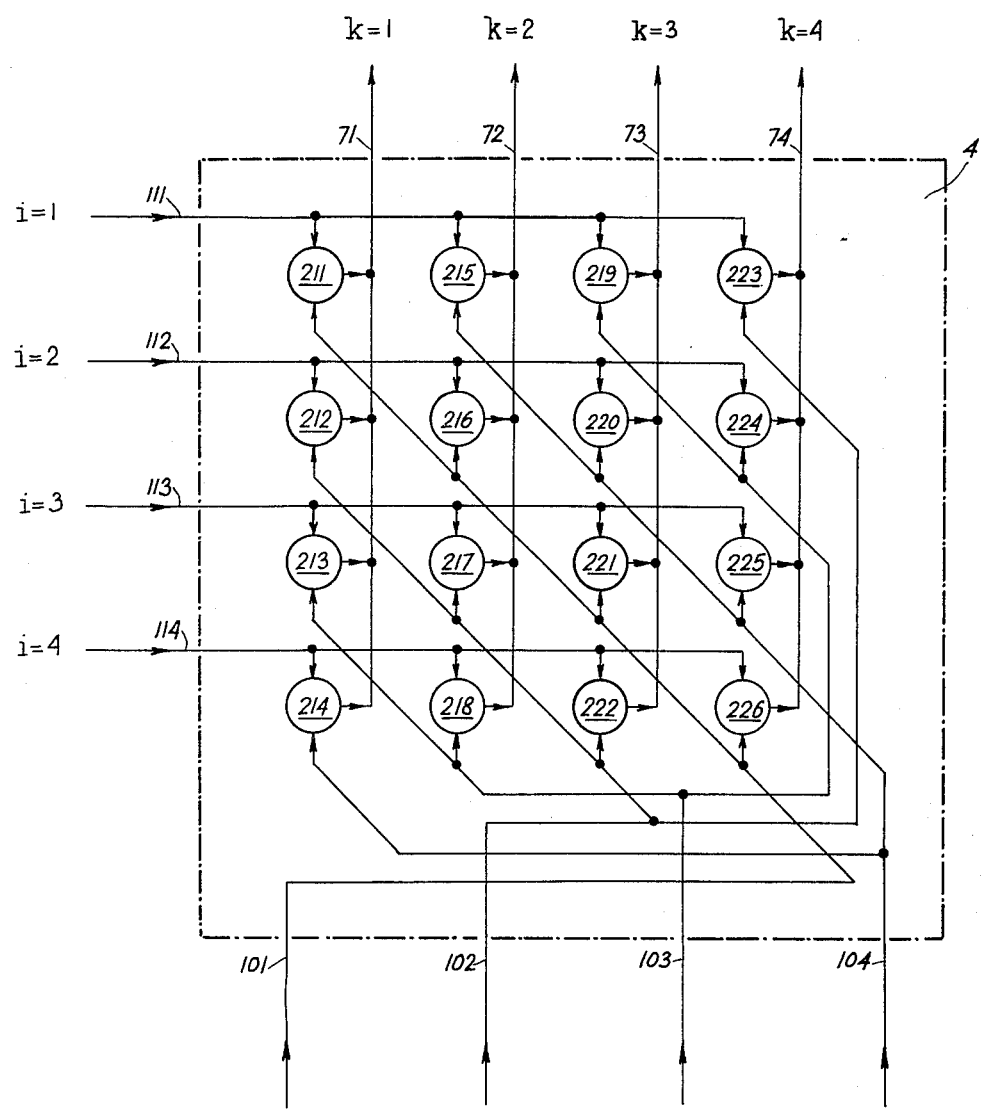
FIG. 20 is a block diagram of the switching circuit of the apparatus of the present invention, as shown in FIG. 13.

The switching circuit 4 (FIG. 13) comprises any suitable circuit arrangement for fulfilling the condition of equation (2). The switching circuit 4 may be combined with the control circuit 3. An embodiment of a suitable switching circuit is shown in FIG. 20. In the switching circuit of FIG. 20 $N=4$. The basic unit of the switching circuit of FIG. 20 is the logic multiple 211.

Figure 14:
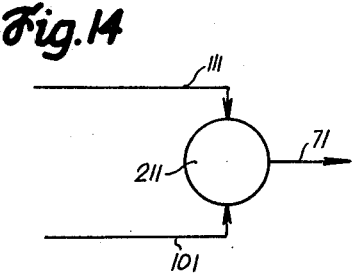
FIG. 14 is a symbol for a logic multiple of the switching circuit of FIG. 13.
Figure 15:
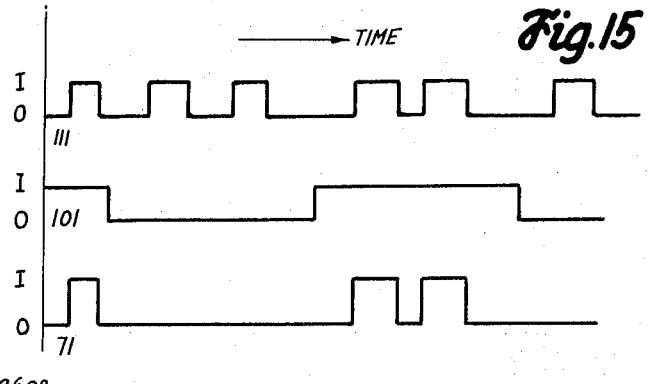
FIG. 15 is a graphical presentation of inputs and outputs of a logic multiple.

The symbol of the logic multiple circuit 211 is shown in FIG. 14 and its operation is shown in FIG. 15. As shown in FIGS. 14, 15 and 20, the final output signal 71 has an amplitude I only when the input signal 111 and the control input signal 101 each simultaneously have an amplitude I. If, however, either or both the input signal 111 or the control input signal 101 has or have an amplitude of zero simultaneously, the final output signal 71 has an amplitude of zero. The switching circuit of FIG. 20 comprises a plurality of logic multiples 211 to 226.

The apparatus of the present invention provides considerable information concerning deflections, deviations, vibrations or oscillations of rotating blades of a turbine, compressor or other machine during the operation of such machine. The apparatus of the present invention may be utilized in powerplants, laboratories, testing areas and may be adapted for determining and insuring the proper operation of turbines, compressors or similar machines and for research purposes.

FIG. 21 shows the control circuit 3 of FIG. 13. In order to maintain the clarity of illustration, four control outputs 2101, 2102, 2103 and 2104 and four control inputs 2201, 2202, 2203 and 2204 are shown. In this case, the control circuit 3 comprises four bistable two pole elements 1001, 1002, 1003 and 1004. The bistable element 1001 has supply terminals 1041 and 1051. The bistable element 1002 has supply terminals 1042 and 1052. The bistable element 1003 has supply terminals 1043 and 1053. The bistable element 1004 has supply terminals 1044 and 1054.

FIG. 22 illustrates the relationship between the current of the bistable element and the voltage at its supply terminals. In FIG. 22, the abscissa represents the voltage V and the ordinate represents the current I. If the voltage increases from zero, the current increases first in the range 1034 of the positive resistance. In the range 1035 of the negative resistance, the current I increases in avalanche fashion for a decreasing voltage.

In FIG. 21, all the bistable two pole elements 1001, 1002, 1003 and 1004 are connected via an auxiliary resistor 1031 to a main terminal 1032. The terminal 1032 is connected to the positive pole of a DC source. The operation of the control circuit 3 may be best understood if it commences at the instant when only the bistable element 1001 is in the range 1035 of the negative resistance, as shown in FIG. 22, whereas the working points of all the other bistable elements 1002, 1003 and 1004 are within the range 1034 of the positive resistance, as shown in FIG. 22.

A substantially larger current therefore passes through the bistable element 1001 than through the other bistable elements, so that a substantially higher voltage appears at the terminals of a working resistor 1011 than at the other working resistors 1012, 1013, and 1014. The voltage level at that working resistor 1011, 1012, 1013 and 1014, the working point of which is within the range 1035 of the negative resistance is indicated as I, whereas the voltage level of all the other working resistors is indicated as O.

The working resistor 1011 is connected in series with the bistable element 1001 via a diode 1021 and the supply terminal 1051. The working resistor 1012 is connected in series with the bistable element 1002 via a diode 1022 and the supply terminal 1052. The working resistor 1013 is connected in series with the bistable element 1003 via a diode 1023 and the supply terminal 1053. The working resistor 1014 is connected in series with the bistable element 1004 via a diode 1024 and the supply terminal 1054.

If, for example, a negative voltage pulse is supplied from the amplifying and shaping circuit 202 of FIG. 13 to the auxiliary input 2202, the voltage difference at the supply or input terminals 1042 and 1052 increases so that the working point of the bistable element 1002 is shifted from the range 1034 of the positive resistance to the range 1035 of the negative resistance and its current increases in avalanche fashion. The voltage drop across the auxiliary resistor 1031 simultaneously increases, so that the voltage at the input terminals 1041 and 1051 of the bistable element 1001 increases to such an extent the working point of said bistable element is shifted from the range 1035 of the negative resistance to the range 1034 of the positive resistance along a curve which is not shown in FIG. 22 in order to maintain the clarity of illustration.

After the termination of the negative pulse at the auxiliary input 2202, only the working point of the bistable element 1002 is within the range 1035 of the negative resistance, whereas the working points of all the other bistable elements 1001, 1003 and 1004 are within the range 1034 of the positive resistance. It is obvious from the foregoing that from the instant that a negative pulse is supplied to some of the auxiliary inputs 2201, 2202, 2203 and 2204, the voltage level I prevails at the corresponding control outputs 2101, 2102, 2103 and 2104, whereas at all the other control outputs, the voltage level O simultaneously prevails until the instant that a negative voltage pulse is supplied to another auxiliary input 2201, 2202, 2203 or 2204.

FIG. 23 illustrates a bistable two pole element which may be utilized as the bistable element 1001, 1002, 1003 or 1004. The base electrode of an auxiliary transistor 1071 is connected to the collector electrode of a main transistor 1061. A biasing resistor 1091 is connected between a common point in the connection between the collector electrode of the main transistor 1061 and the base electrode of the auxiliary transistor 1071 and a common point in a connection between the base electrode of said main transistor and the collector electrode of said auxiliary transistor.

The input or supply terminal 1041 is directly connected to the emitter electrode of the main transistor 1061 and is connected to the base electrode of said main transistor and to the collector electrode of the auxiliary transistor 1071 via a limiting resistor 1081. The input or supply terminal 1051 is directly connected to the emitter electrode of the auxiliary transistor 1071 and is connected to the base electrode of said auxiliary transistor and to the collector electrode of the main transistor 1061 with a load resistor.

If the voltage at the supply terminals 1041 and 1051 increases from zero and is small in magnitude, only a small current passes through both the main transistor 1061 and the auxiliary transistor 1071, so that the bistable element 1001 functions as a resistance. Only if the voltage at the supply terminals 1041 and 1051 is further increased, are both transistors 1061 and 1071 switched to their conductive condition. There is then a positive feedback, determined by the resistance magnitudes of the limiting resistor 1081, the biasing resistor 1091 and the load resistor 1101. The current consequently increases in the manner of an avalanche upon a simultaneous decrease in the voltage at the supply or input terminals 1041 and 1051.

It is obvious that the control circuit 3 and the bistable elements 1001, 1002, 1003 and 1004 may comprise other suitable circuits than those described herein. Since these circuits are known, they are not further described herein.

The apparatus of the present invention may be utilized with steam and gas turbines for determining the frequency and amplitude of oscillations of the investigated rotating blades in the course of operation of said turbines or machines. The measuring pickup devices are mounted on the distributing wheel. The reference and auxiliary pickup devices are mounted on the surface of the shaft either between the packing and the bearing of the turbine or on another part of the shaft, where they are readily accessible. The reference and auxiliary pickups are mounted on a special holder which may be rotated around the axis of the shaft in order to change the angular position of the reference and auxiliary pickups. This permits any group of blades to be selected for investigation during the course of operation of the machine.

The apparatus of the present invention permits, by an occasional inspection of the machine, checking of the function of all blades of the rotor on which measuring pickups are mounted. The supply conductors to the measuring pickups are brought to the electrical circuits positioned outside the turbine through bores or openings formed through the turbine housing. Electrical pulses are provided at the outputs of the switching circuit 4 (FIGS. 13 and 20), so that just one of the selected blades corresponds to each output. If the blade oscillates, the duration of the pulse at the corresponding output of the switching circuit 4 is changed.

The duration of the pulse is measured by electrical devices and the measured value may be recorded by a recording device, a measuring magnetic tape recorder, or an auxiliary storage device for further evaluation and numerical computations. The measured values may also be fed directly into a counter, which instantaneously evaluates the amplitude and frequency of oscillations of the investigated rotating blades, so that it is possible to check the operation of the machine at any time. The measuring apparatus may operate for a long time, due to the fact that only measuring pickups are mounted in the interior of the turbine, and said pickups are not adversely affected by centrifugal forces and oscillations, and may also operate at elevated temperatures and moisture, if suitably designed.

Another application of the apparatus of the present invention is the measuring of oscillations of rotating blades during the starting of the machine. The amplitudes and frequencies of oscillation may be measured under different conditions of operation of the machine. In similar instances, it is necessary to supply to the storage device or counter data of the rotating speed of the shaft.

The described apparatus is therefore suitable for research and operational measurements of gas or steam turbines and compressors, since it permits the derivation of sufficient information for evaluation of the amplitude and frequency of oscillations, in all conditions of the machine. The apparatus of the present invention may be utilized for aircraft turbines and compressors to check the operation of rotating blades under all flight conditions. The group of investigated blades may be changed, so that the reference and auxiliary pulses are delayed by electrical delay components, thereby eliminating the necessity for mechanically rotating the pickup holder.

Another application of the apparatus of the present invention is the measuring of dynamic components of the torque of a shaft. Reference and auxiliary elements are mounted on one end of the shaft, with reference and measuring pickups being mounted on a special holder in the vicinity of said elements. Measuring elements, which correspond to the aforementioned rotating blades, are mounted on the other end of the shaft, which is twisted due to the load. Measuring pickups are mounted on the stable machine frame in the vicinity of the measuring elements.

Figure 24:
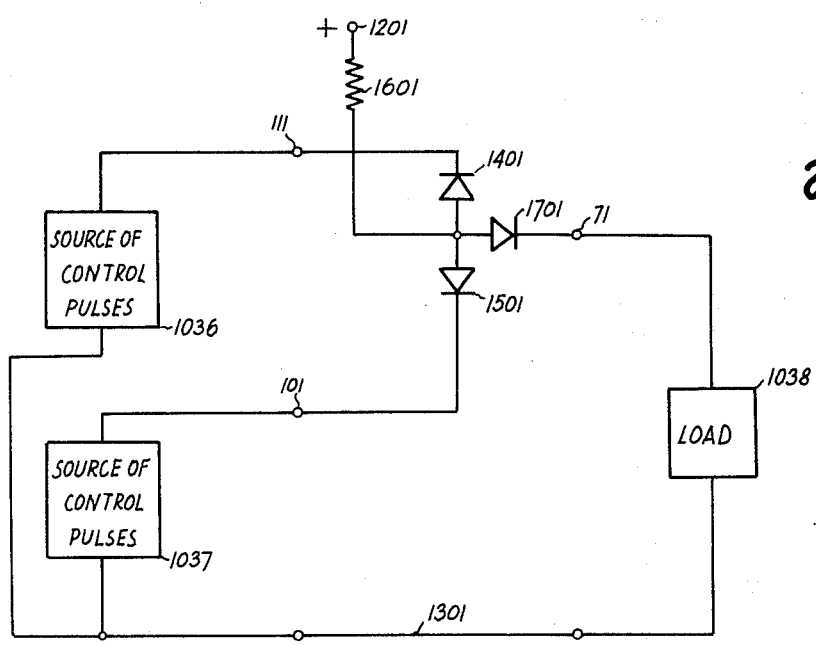
FIG. 24 is a circuit diagram of an embodiment of the logic multiple of FIGS. 14 and 20.

FIG. 24 shows a logic multiple which may be utilized as the logic multiple 211 of FIGS. 14 and 20. In FIG. 24, the positive pole of a DC voltage source (not shown in the FIG.) is connected to an input or supply terminal 1201. The negative pole of the DC voltage source is connected to a common conductor 1301. A source 1036 of signal pulses is connected to the signal input 111 and is not part of the proper logic multiple.

A source 1037 of control pulses is connected to the control input 101 and is not part of the proper logic multiple. A load 1038 is connected to the output 71 and is not part of the logic multiple. If the source 1036 of signal pulses and the source 1037 of control pulses supply no voltage, the current passes from the supply terminal 1201, via a common resistor 1601, a signal diode 1401 and a control diode 1501, the source 1036 of signal pulses and the source 1037 of control pulses, to the common conductor 1301.

A voltage drop is produced due to the flow of current in the common resistor 1601, and consequently the voltage level at the output 71 is low and is indicated as O. This is true even if only the source 1036 of signal pulses generates a positive voltage and the source 1037 of control pulses generates no voltage, so that the current again passes from the supply terminal 1201, via the common resistor 1601, the control diode 1501 and the source 1037 of control pulses to the common conductor 1301. The voltage level at the output 71 is equally low and is indicated as O, if only the source 1037 of control pulses generates a positive voltage, so that the current again passes, via the common resistor 1601, the signal diode 1401 and the source 1036 of signal pulses to the common conductor 1301.

Only if the source 1036 of signal pulses and the source 1037 of control pulses simultaneously generate a positive voltage at a level indicated as I, the voltage level I is equally provided at the output 71. It is thus obvious that the voltage level I is provided at the output 71 only if said voltage level is simultaneously provided at the signal input 111 and at the control input 101. In any other circumstances, the voltage level O is provided at the output 71.

There are a number of other possible interconnections of the circuit 211 of the logic multiple. These may utilize, for example, transistors or electron tubes, and all operate in the same manner as the aforedescribed circuit of the logic multiple.

The interdependence of both levels O and I on the control input 101, the signal input 111 and the output 71, as hereinbefore described, is shown in FIG. 15. The upper curve of FIG. 15 shows the levels O and I at the signal input 111, at different instants The center curve of FIG. 15 shows the levels O and I at the control input 101, at different instants. The lower curve of FIG. 15 shows the levels O and I at the output 71. Points corresponding to the same instant of time in the upper, center and lower curves of FIG. 15 are on a common vertical line.

Figure 25:
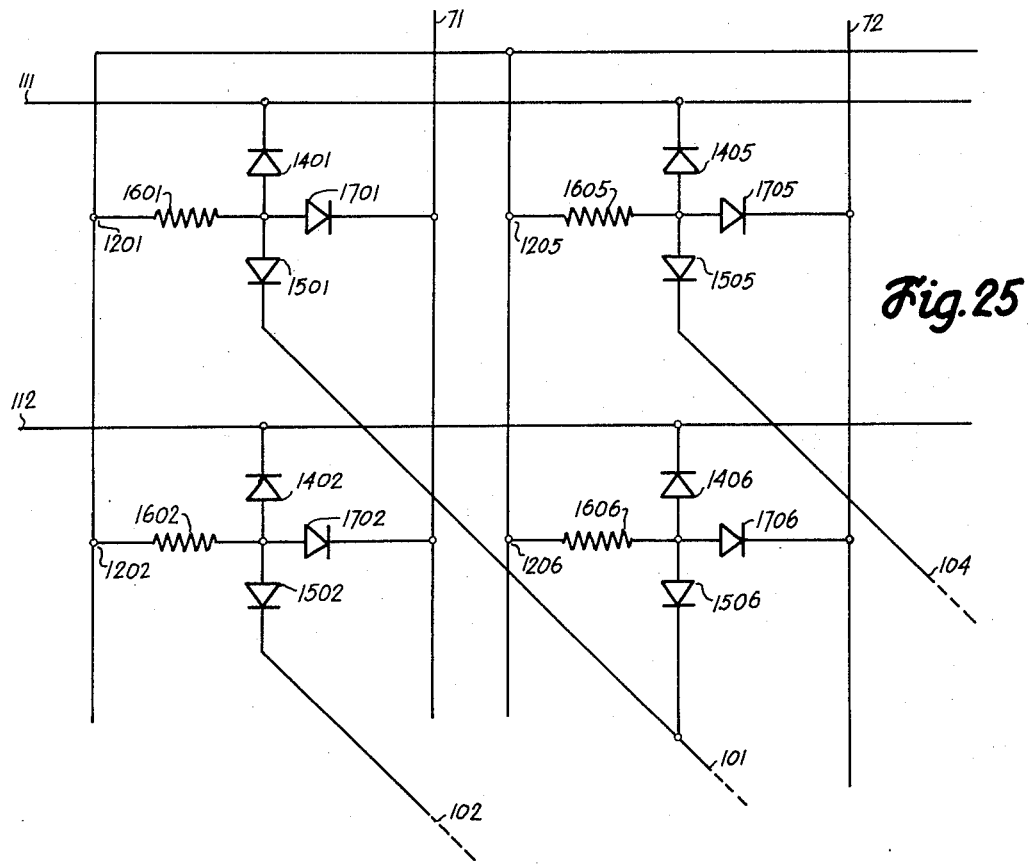
FIG. 25 is a circuit diagram of the switching circuit of FIG. 20.

FIG. 25 shows the switching circuit 4 of FIGS. 13 and 20. In the switching circuit shown in FIG. 20, the individual logic multiple circuits 211, 212, 213, and so on, are depicted as circles, in order to maintain the clarity of illustration. The supplies or inputs to the circuits of the logic multiples 211, 212, 213, and so on, are provided as shown in FIG. 14, where the signal input 111 is supplied to the top, the control input 101 is supplied to the bottom and the output 71 is derived from the right. In FIG. 20, all the signal inputs are interconnected, so that they form the signal inputs 111, 112, 113, and so on, of the switching circuit 4. The control inputs are interconnected in the same manner, so that they form the control inputs 101, 102, 103, and so on, of the switching circuit 4. The outputs are connected in such a manner that they form the outputs 71, 72, 73, and so on, of the switching circuit 4.

FIG. 25 shows four logic multiple circuits 211, 212, 215 and 216, each as shown in FIG. 24. The logic multiple circuits are connected in part of the switching circuit 4. The operation of the switching circuit of FIG. 20 is described for $N = 4$.

Since the logic circuits 211, 212, 213, and so on, function in the aforedescribed manner, if the voltage level at the control input is I, for example, a voltage pulse having the level I, which is supplied to the signal input 111, is supplied to the output 71 via the logic circuit 211. The pulse from the signal input 112 is supplied to the output 72 via the logic multiple circuit 216, and so on. If, however, the voltage level I is applied to the control input 103, the pulse from the signal input 111 is supplied to the output 73 via the logic multiple circuit 219. The pulse from the signal input 112 is supplied to the output 74 via the logic multiple circuit 224.

The switching circuit 4 need not be that disclosed, but may comprise any suitable switching circuit.

While the invention has been described by means of specific examples and in a specific embodiment, we do not wish to be limited thereto, for obvious modifications will occur to those skilled in the art without departing from the spirit and scope of the invention.

What we claim is:

1. Apparatus for switching pulses in measuring the vibration of rotating parts during operation of a machine, said machine comprising, a number of rotating parts subject to vibratory deflection including N rotating parts whose deflections are to be measured, and stationary parts said apparatus comprising N measuring pickup devices mounted on a stationary part of said machine adjacent the path of the deflectable portions of said rotating parts, said rotating parts successively inducing a pulse in each of said measuring pickup devices as they pass in operative proximity with each other;

N reference elements mounted on a rotary part of said machine not subject to vibratory deflection;

N reference pickup devices mounted on a stationary part of said machine, said reference elements successively inducing a pulse in each of said reference pickup devices as they pass in operative proximity with each other;

auxiliary elements mounted on a rotary part of said machine not subject to vibratory deflection;

auxiliary pickup devices mounted on a stationary part of said machine, said auxiliary elements successively inducing a pulse in each of said auxiliary pickup devices as they pass in operative proximity with each other;

N measuring systems each connected to a corresponding one of said measuring pickup devices and a corresponding one of said reference pickup devices for comparing the time between a pulse produced by said reference pickup device and the succeeding pulse from the corresponding measuring pickup device, and providing an output pulse having an amplitude I and a duration equal to the time between said compared pulses;

a switching circuit having N outputs, a plurality of control inputs and N pulse inputs each connected to the output of a corresponding one of said measuring systems; and a control circuit having a plurality of a a corresponding one of the control inputs of said switching circuit and a plurality of inputs each coupled to a corresponding one of said auxiliary pickup devices for controlling the operation of said switching circuit, said control circuit providing N output combinations having an output amplitude A during each revolution of the rotating parts of said machine in accordance with the pulses produced by said auxiliary pickup devices, the output combinations of said control circuit being supplied to said switching circuit via the control inputs of said switching circuit to control the operation of said switching circuit to supply a pulse having an output amplitude I of the $i^{th}$ measuring system to the $k^{th}$ or $N^{th}$ output of said switching system when $$k = 1 + i - j$$

when $$i \geq j$$

and $$k = N + 1 + i - j$$

when $i < j$, wherein $j$ is the ordinal number of the combination of output positions at the outputs of said control circuit having the output amplitude A, and $i$ and $j$ are numbers which increase incrementally from 1 to $N$ during each revolution of the rotating parts of said machine in a selected direction, the output pulses of said measuring systems having an amplitude I corresponding to one rotating part to be measured being supplied to one and the same output of said switching circuit.

2. Apparatus for switching pulses as claimed in claim 1, wherein said control circuit transforms the output combinations thereof having an output amplitude A to another output combination once in each time interval between next-adjacent successive pulses of each of said measuring systems having an output amplitude I.

3. Apparatus for switching pulses as claimed in claim 1, wherein the measuring pickup device and the reference pickup device of each measuring system are angularly spaced $\beta$ degrees from each other relative to of the rotating parts of said machine, the angle $\beta$ being equal and of the same direction in all the measuring systems.

4. Apparatus for switching pulses as claimed in claim 1, wherein each of said measuring systems comprises a flip-flop having an output connected to a pulse input of said switching circuit and a pair of inputs, amplifier and shaper means coupling the corresponding measuring pickup device to one input of said flip-flop and delay means and amplifier and shaper means connected in series with each other and coupling the corresponding reference pickup device to the other input of said flip-flop.

5. Apparatus for switching pulses as claimed in claim 1, wherein each of said reference elements is angularly spaced $\alpha$ degrees from the corresponding rotating part of the machine to be measured relative to the axis of rotation of the rotating parts of said machine, the angle $\alpha$ being equal and of the same direction for each of said reference elements and each of its corresponding rotating parts to be measured.

6. Apparatus for switching pulses as claimed in claim 1, further comprising a plurality of amplifier and shaper means each having an output connected to a corresponding one of the inputs of said control circuit and an input and a plurality of delay means each coupling a corresponding one of said auxiliary pickup devices to the input of a corresponding one of said amplifier and shaper means.

7. Apparatus for switching pulses as claimed in claim 3, wherein each of said reference elements is angularly spaced $\alpha$ degrees from the corresponding rotating part of the machine to be measured relative to the axis of rotation of the rotating parts of said machine, the angle $\alpha$ being equal and of the same direction for each of said reference elements and each of its corresponding rotating parts to be measured.

8. Apparatus for switching pulses as claimed in claim 7, wherein each of said measuring systems comprises a flip-flop having an output connected to a pulse input of said switching circuit and a pair of inputs, amplifier and shaper means coupling the corresponding measuring pickup device to one input of said flip-flop and delay means and amplifier and shaper means connected in series with each other and coupling the corresponding reference pickup device to the other input of said flip-flop and further comprising a plurality of amplifier and shaper means each having an output connected to a corresponding one of the inputs of said control circuit and an input and a plurality of delay means each coupling a corresponding one of said auxiliary pickup devices to the input of a corresponding one of said amplifier and shaper means.